United States Patent
Khoshnevisan et al.

(10) Patent No.: US 12,519,585 B2
(45) Date of Patent: Jan. 6, 2026

(54) COMB OFFSET HOPPING FOR SOUNDING REFERENCE SIGNAL TRANSMISSIONS

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 404 days.

(21) Appl. No.: 17/711,943

(22) Filed: Apr. 1, 2022

(65) Prior Publication Data

US 2023/0318768 A1    Oct. 5, 2023

(51) Int. Cl.
*H04L 5/00* (2006.01)
*H04B 1/713* (2011.01)
*H04W 72/0446* (2023.01)

(52) U.S. Cl.
CPC .......... *H04L 5/0048* (2013.01); *H04B 1/713* (2013.01); *H04W 72/0446* (2013.01)

(58) Field of Classification Search
CPC .............. H04L 5/0048; H04L 5/0035; H04L 5/0073; H04B 1/713; H04W 72/0446
See application file for complete search history.

(56) References Cited

U.S. PATENT DOCUMENTS

| | | |
|---|---|---|
| 9,414,319 B2 | 8/2016 | Chen et al. |
| 10,405,305 B2 | 9/2019 | Hosseini et al. |
| 10,750,485 B2 | 8/2020 | Hwang et al. |
| 10,756,868 B2 | 8/2020 | Chen et al. |
| 10,778,315 B2 | 9/2020 | Wong et al. |
| 11,039,433 B2 | 6/2021 | Wang et al. |
| 11,063,652 B2 | 7/2021 | Xiong et al. |
| 11,115,242 B2 | 9/2021 | Akkarakaran et al. |
| 11,184,195 B2 | 11/2021 | Zhang et al. |

(Continued)

FOREIGN PATENT DOCUMENTS

| | | | | |
|---|---|---|---|---|
| EP | 3958624 A1 | * | 2/2022 | .......... H04W 64/006 |
| EP | 4138325 A1 | | 2/2023 | |

(Continued)

OTHER PUBLICATIONS

International Search Report and Written Opinion—PCT/US2023/016514—ISA/EPO—Jun. 29, 2023(2202552WO).

(Continued)

*Primary Examiner* — Steven Hieu D Nguyen
(74) *Attorney, Agent, or Firm* — Holland & Hart LLP

(57) ABSTRACT

Methods, systems, and devices for wireless communication are described. A user equipment (UE) may receive signaling identifying a sounding reference signal (SRS) configuration for the UE, the SRS configuration indicating at least a SRS comb offset hopping configuration. The UE may select, based at least in part on the comb offset hopping configuration, a hopping pattern for SRS transmissions across multiple SRS transmission occasions, the hopping pattern comprising a different comb offset applied for each SRS transmission occasion. The UE may transmit the SRSs across multiple SRS transmission occasions according to the SRS configuration and the hopping pattern.

30 Claims, 13 Drawing Sheets

(56) References Cited

U.S. PATENT DOCUMENTS

| | | |
|---|---|---|
| 11,196,523 B2 | 12/2021 | Liu et al. |
| 11,277,238 B2 | 3/2022 | Chen et al. |
| 11,310,023 B2 | 4/2022 | Manolakos et al. |
| 11,337,194 B2 | 5/2022 | Hwang et al. |
| 11,431,454 B2 | 8/2022 | Matsumura et al. |
| 11,431,527 B2 | 8/2022 | Zhang et al. |
| 11,457,451 B2 | 9/2022 | Matsumura et al. |
| 11,477,809 B2 | 10/2022 | Hosseini et al. |
| 11,509,372 B2 | 11/2022 | Liu et al. |
| 11,552,763 B2 | 1/2023 | Chen et al. |
| 11,601,945 B2 | 3/2023 | Bachu et al. |
| 11,641,642 B2 | 5/2023 | Levitsky et al. |
| 11,729,782 B2 | 8/2023 | Zhang et al. |
| 11,757,680 B2 | 9/2023 | Zhang et al. |
| 11,824,806 B2 | 11/2023 | Xu et al. |
| 12,107,783 B2 | 10/2024 | Zhang et al. |
| 12,113,738 B2 | 10/2024 | Xu et al. |
| 12,149,471 B2 | 11/2024 | Munier |
| 2011/0098054 A1 | 4/2011 | Gorokhov et al. |
| 2011/0110398 A1 | 5/2011 | Zhang et al. |
| 2011/0280220 A1 | 11/2011 | Jia et al. |
| 2013/0322280 A1 | 12/2013 | Pi |
| 2014/0036809 A1 | 2/2014 | Xu et al. |
| 2015/0110037 A1 | 4/2015 | Wu et al. |
| 2018/0227949 A1 | 8/2018 | Tiirola et al. |
| 2018/0317256 A1 | 11/2018 | Um et al. |
| 2019/0109732 A1* | 4/2019 | Choi ............... H04L 5/0051 |
| 2019/0158244 A1 | 5/2019 | Shin et al. |
| 2019/0174525 A1 | 6/2019 | Kwak et al. |
| 2019/0199555 A1 | 6/2019 | Munier et al. |
| 2019/0372734 A1* | 12/2019 | Choi ............... H04B 7/0628 |
| 2020/0228213 A1 | 7/2020 | Masal et al. |
| 2020/0229180 A1 | 7/2020 | Liu et al. |
| 2020/0235877 A1 | 7/2020 | Manolakos et al. |
| 2020/0288461 A1 | 9/2020 | Hwang et al. |
| 2020/0313932 A1 | 10/2020 | Sun et al. |
| 2021/0105040 A1 | 4/2021 | Manolakos et al. |
| 2023/0050730 A1* | 2/2023 | Wang ............... H04W 52/42 |
| 2023/0136464 A1 | 5/2023 | Wang et al. |
| 2023/0147157 A1 | 5/2023 | Ibrahim et al. |
| 2023/0155765 A1* | 5/2023 | Zhang ............... H04L 5/0012 370/329 |
| 2023/0179365 A1 | 6/2023 | Nam et al. |
| 2023/0291626 A1 | 9/2023 | Chen et al. |
| 2023/0396387 A1* | 12/2023 | Harrison ........... H04L 5/0094 |
| 2024/0014960 A1 | 1/2024 | Khoshnevisan et al. |
| 2024/0048175 A1 | 2/2024 | Chen et al. |
| 2024/0056339 A1 | 2/2024 | Lee et al. |
| 2024/0187184 A1* | 6/2024 | Gao ............... H04L 27/26035 |
| 2025/0015952 A1 | 1/2025 | Shibaike et al. |
| 2025/0030515 A1 | 1/2025 | Zhang et al. |
| 2025/0038913 A1 | 1/2025 | Munier |
| 2025/0089010 A1 | 3/2025 | Yu et al. |
| 2025/0089011 A1 | 3/2025 | Yu et al. |
| 2025/0119252 A1 | 4/2025 | Davydov et al. |

FOREIGN PATENT DOCUMENTS

| | | | |
|---|---|---|---|
| WO | WO-2020213126 A1 * | 10/2020 | ......... H04W 64/006 |
| WO | WO-2021155818 A1 * | 8/2021 | ......... H04L 5/0012 |
| WO | WO-2021208779 A1 | 10/2021 | |

OTHER PUBLICATIONS

Qualcomm Incorporated: "SRS enhancement for TDD CJT and 8 Tx operation", 3GPP TSG RAN WG1 #112, R1-2301399, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 26 Pages, XP052248532.

* cited by examiner

COMB OFFSET HOPPING FOR SOUNDING REFERENCE SIGNAL TRANSMISSIONS

FIELD OF TECHNOLOGY

The following relates to wireless communication, including comb offset hopping for sounding reference signal transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support comb offset hopping for sounding reference signal (SRS) transmissions. For example, the described techniques provide various mechanisms for a user equipment (UE) to perform SRS transmissions across multiple SRS transmission occasions, wherein SRS comb offset hopping is enabled (alone or in combination with other hopping techniques) for the SRS transmissions. For example, The UE may be configured (e.g., using radio resource control (RRC) configuration signaling from a network entity associated with a cell/TRP receiving the SRS transmission(s)) with a SRS configuration. The SRS configuration may carry or otherwise convey an SRS comb offset hopping configuration, which may generally signal comb offset hopping information for the SRS transmissions across multiple SRS transmission occasions. Accordingly, the UE may identify, select, or otherwise determine a hopping pattern for the SRS transmissions according to the comb offset hopping configuration. For example, the hopping pattern may include different comb offsets being applied for each SRS transmission occasion (e.g., different comb offset for each/some symbol(s) within a slot, for different slots within a radio frame, and the like). Accordingly, the UE may transmit the SRS during the corresponding SRS transmission occasions using the hopping pattern and based on the configured SRS configuration.

A method for wireless communication at a user equipment (UE) is described. The method may include receiving signaling identifying a sounding reference signal configuration for the UE, the sounding reference signal configuration indicating at least a sounding reference signal comb offset hopping configuration, selecting, based on the comb offset hopping configuration, a hopping pattern for sounding reference signal transmissions across multiple sounding reference signal transmission occasions, the hopping pattern including a different comb offset applied for each sounding reference signal transmission occasion, and transmitting the sounding reference signals across multiple sounding reference signal transmission occasions according to the sounding reference signal configuration and the hopping pattern.

An apparatus for wireless communication at a UE is described. The apparatus may include a processor, memory coupled with the processor, and instructions stored in the memory. The instructions may be executable by the processor to cause the apparatus to receive signaling identifying a sounding reference signal configuration for the UE, the sounding reference signal configuration indicating at least a sounding reference signal comb offset hopping configuration, select, based on the comb offset hopping configuration, a hopping pattern for sounding reference signal transmissions across multiple sounding reference signal transmission occasions, the hopping pattern including a different comb offset applied for each sounding reference signal transmission occasion, and transmit the sounding reference signals across multiple sounding reference signal transmission occasions according to the sounding reference signal configuration and the hopping pattern.

Another apparatus for wireless communication at a UE is described. The apparatus may include means for receiving signaling identifying a sounding reference signal configuration for the UE, the sounding reference signal configuration indicating at least a sounding reference signal comb offset hopping configuration, means for selecting, based on the comb offset hopping configuration, a hopping pattern for sounding reference signal transmissions across multiple sounding reference signal transmission occasions, the hopping pattern including a different comb offset applied for each sounding reference signal transmission occasion, and means for transmitting the sounding reference signals across multiple sounding reference signal transmission occasions according to the sounding reference signal configuration and the hopping pattern.

A non-transitory computer-readable medium storing code for wireless communication at a UE is described. The code may include instructions executable by a processor to receive signaling identifying a sounding reference signal configuration for the UE, the sounding reference signal configuration indicating at least a sounding reference signal comb offset hopping configuration, select, based on the comb offset hopping configuration, a hopping pattern for sounding reference signal transmissions across multiple sounding reference signal transmission occasions, the hopping pattern including a different comb offset applied for each sounding reference signal transmission occasion, and transmit the sounding reference signals across multiple sounding reference signal transmission occasions according to the sounding reference signal configuration and the hopping pattern.

Some examples of the method, apparatuses, and non-transitory computer-readable medium described herein may further include operations, features, means, or instructions for identifying, based on the offset hopping configuration, a slot number within a radio frame and a symbol number within a slot, where the multiple sounding reference signal transmission occasions may be based on the radio frame and the slot, where the hopping pattern may be selected based on the slot number within the radio frame and the symbol number within the slot.

In some examples of the method, apparatuses, and non-transitory computer-readable medium described herein, the hopping pattern defines different comb offsets for different symbols within the slot.

Some examples of the method, apparatuses, and non-transitory computer-readable medium described herein may further include operations, features, means, or instructions for identifying, based on the offset hopping configuration, a slot number within a radio frame, where the multiple sounding reference signal transmission occasions may be based on the radio frame, where the hopping pattern may be selected based on the slot number within the radio frame.

In some examples of the method, apparatuses, and non-transitory computer-readable medium described herein, the hopping pattern defines a same comb offset for different symbols within a slot of the radio frame.

Some examples of the method, apparatuses, and non-transitory computer-readable medium described herein may further include operations, features, means, or instructions for identifying, based on the offset hopping configuration, a slot number within a radio frame and a starting symbol, where the multiple sounding reference signal transmission occasions may be based on the radio frame and the starting symbol, where the hopping pattern may be selected based on the slot number within the radio frame and the starting symbol.

In some examples of the method, apparatuses, and non-transitory computer-readable medium described herein, the hopping pattern defines a same comb offset for different symbols within a slot of the radio frame.

Some examples of the method, apparatuses, and non-transitory computer-readable medium described herein may further include operations, features, means, or instructions for identifying, based on the comb offset hopping configuration, a sequence initialization indicator associated with an identifier of the sounding reference signal configuration, where the hopping pattern may be selected based on the sequence initialization indicator.

Some examples of the method, apparatuses, and non-transitory computer-readable medium described herein may further include operations, features, means, or instructions for identifying, based on the comb offset hopping configuration, a cyclic shift information associated with the sounding reference signal configuration, where the hopping pattern may be selected based on the sequence initialization indicator and the cyclic shift information.

In some examples of the method, apparatuses, and non-transitory computer-readable medium described herein, the signaling includes radio resource control (RRC) signaling.

A method for wireless communication at a network entity is described. The method may include selecting, based on a comb offset hopping configuration, a hopping pattern for sounding reference signal transmissions across multiple sounding reference signal transmission occasions for a UE, the hopping pattern including a different comb offset applied for each sounding reference signal transmission occasion, transmitting signaling identifying a sounding reference signal configuration, the sounding reference signal configuration indicating at least a sounding reference signal comb offset hopping configuration for the hopping pattern, and receiving the sounding reference signals across multiple sounding reference signal transmission occasions according to the sounding reference signal configuration and the hopping pattern.

An apparatus for wireless communication at a network entity is described. The apparatus may include a processor, memory coupled with the processor, and instructions stored in the memory. The instructions may be executable by the processor to cause the apparatus to select, based on a comb offset hopping configuration, a hopping pattern for sounding reference signal transmissions across multiple sounding reference signal transmission occasions for a UE, the hopping pattern including a different comb offset applied for each sounding reference signal transmission occasion, transmit signaling identifying a sounding reference signal configuration, the sounding reference signal configuration indicating at least a sounding reference signal comb offset hopping configuration for the hopping pattern, and receive the sounding reference signals across multiple sounding reference signal transmission occasions according to the sounding reference signal configuration and the hopping pattern.

Another apparatus for wireless communication at a network entity is described. The apparatus may include means for selecting, based on a comb offset hopping configuration, a hopping pattern for sounding reference signal transmissions across multiple sounding reference signal transmission occasions for a UE, the hopping pattern including a different comb offset applied for each sounding reference signal transmission occasion, means for transmitting signaling identifying a sounding reference signal configuration, the sounding reference signal configuration indicating at least a sounding reference signal comb offset hopping configuration for the hopping pattern, and means for receiving the sounding reference signals across multiple sounding reference signal transmission occasions according to the sounding reference signal configuration and the hopping pattern.

A non-transitory computer-readable medium storing code for wireless communication at a network entity is described. The code may include instructions executable by a processor to select, based on a comb offset hopping configuration, a hopping pattern for sounding reference signal transmissions across multiple sounding reference signal transmission occasions for a UE, the hopping pattern including a different comb offset applied for each sounding reference signal transmission occasion, transmit signaling identifying a sounding reference signal configuration, the sounding reference signal configuration indicating at least a sounding reference signal comb offset hopping configuration for the hopping pattern, and receive the sounding reference signals across multiple sounding reference signal transmission occasions according to the sounding reference signal configuration and the hopping pattern.

Some examples of the method, apparatuses, and non-transitory computer-readable medium described herein may further include operations, features, means, or instructions for identifying, based on the offset hopping configuration, a slot number within a radio frame and a symbol number within a slot, where the multiple sounding reference signal transmission occasions may be based on the radio frame and the slot, where the hopping pattern may be selected based on the slot number within the radio frame and the symbol number within the slot.

In some examples of the method, apparatuses, and non-transitory computer-readable medium described herein, the hopping pattern defines different comb offsets for different symbols within the slot.

Some examples of the method, apparatuses, and non-transitory computer-readable medium described herein may further include operations, features, means, or instructions for identifying, based on the offset hopping configuration, a slot number within a radio frame, where the multiple sounding reference signal transmission occasions may be based on the radio frame, where the hopping pattern may be selected based on the slot number within the radio frame.

In some examples of the method, apparatuses, and non-transitory computer-readable medium described herein, the hopping pattern defines a same comb offset for different symbols within a slot of the radio frame.

Some examples of the method, apparatuses, and non-transitory computer-readable medium described herein may further include operations, features, means, or instructions for identifying, based on the offset hopping configuration, a slot number within a radio frame and a starting symbol, where the multiple sounding reference signal transmission occasions may be based on the radio frame and the starting symbol, where the hopping pattern may be selected based on the slot number within the radio frame and the starting symbol.

In some examples of the method, apparatuses, and non-transitory computer-readable medium described herein, the hopping pattern defines a same comb offset for different symbols within the slot.

Some examples of the method, apparatuses, and non-transitory computer-readable medium described herein may further include operations, features, means, or instructions for identifying, based on the comb offset hopping configuration, a sequence initialization indicator associated with an identifier of the sounding reference signal configuration, where the hopping pattern may be selected based on the sequence initialization indicator.

Some examples of the method, apparatuses, and non-transitory computer-readable medium described herein may further include operations, features, means, or instructions for identifying, based on the comb offset hopping configuration, a cyclic shift information associated with the sounding reference signal configuration, where the hopping pattern may be selected based on the sequence initialization indicator and the cyclic shift information.

In some examples of the method, apparatuses, and non-transitory computer-readable medium described herein, the signaling includes RRC signaling.

DETAILED DESCRIPTION

Wireless communications systems may support a user equipment (UE) performing a sounding reference signal (SRS) transmission to a network entity, such as a cell, transmission/reception point (TRP), and the like, associated with the network entity. For example, the network entity may configure the UE with SRS resource(s)/resource set(s) identifying the resources and/or parameters to be used for the SRS transmissions. In some examples, this may include the SRS configuration identifying a comb spacing for the SRS transmissions (e.g., the separation between SRS transmissions within a symbol), the SRS comb offset (e.g., the starting subcarrier within a RB relative to a base subcarrier index, such as subcarrier 0), and the like. Such networks may also configure the SRS transmissions for group hopping and/or sequence hopping for the SRS transmissions across multiple SRS transmission occasions, such as when different UE are configured for SRS transmissions to avoid/mitigate interference. However, some wireless communications systems may support the UE being configured for SRS transmissions to multiple cells/TRPs. This may result in increased SRS transmissions within a given SRS occasion due to a large number of UE performing SRS transmission to different cells/TRPs.

Accordingly, aspects of the techniques described herein provide various mechanisms for a UE to perform SRS transmissions across multiple SRS transmission occasions, wherein SRS comb offset hopping is enabled (alone or in combination with other hopping techniques). For example, The UE may be configured (e.g., using RRC configuration signaling from a network entity associated with a cell/TRP receiving the SRS transmission(s)) with a SRS configuration. The SRS configuration may carry or otherwise convey an SRS comb offset hopping configuration, which may generally signal comb offset hopping information for the SRS transmissions across multiple SRS transmission occasions. Accordingly, the UE may identify, select, or otherwise determine a hopping pattern for the SRS transmissions according to the comb offset hopping configuration. For example, the hopping pattern may include different comb offsets being applied for each SRS transmission occasion (e.g., different comb offset for each/some symbol(s) within a slot, for different slots within a radio frame, and the like). Accordingly, the UE may transmit the SRS during the corresponding SRS transmission occasions using the hopping pattern and based on the configured SRS configuration.

Aspects of the disclosure are initially described in the context of wireless communications systems. Aspects of the disclosure are further illustrated by and described with reference to apparatus diagrams, system diagrams, and flowcharts that relate to comb offset hopping for SRS transmissions.

Figure 1:
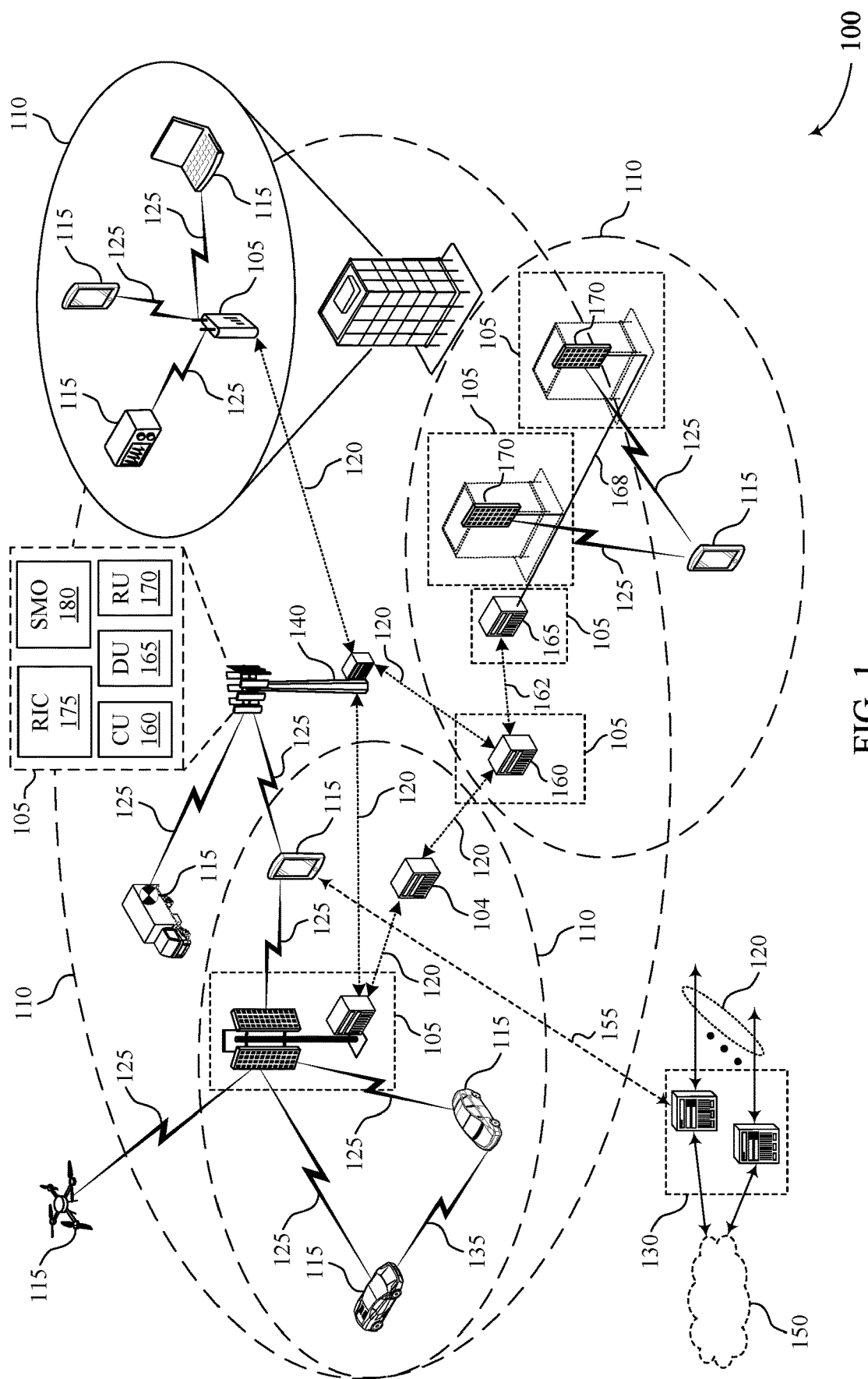
FIG. 1 illustrates an example of a wireless communications system that supports comb offset hopping for sounding reference signal (SRS) transmissions in accordance with one or more aspects of the present disclosure.

FIG. 1 illustrates an example of a wireless communications system 100 that supports comb offset hopping for SRS transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support comb offset hopping for SRS transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may receive signaling identifying a SRS configuration for the UE, the SRS configuration indicating at least a SRS comb offset hopping configuration. The UE 115 may select, based at least in part on the comb offset hopping configuration, a hopping pattern for SRS transmissions across multiple SRS transmission occasions, the hopping pattern comprising a different comb offset applied for each SRS transmission occasion. The UE 115 may transmit the SRSs across multiple SRS transmission occasions according to the SRS configuration and the hopping pattern.

A network entity 105 may select, based at least in part on a comb offset hopping configuration, a hopping pattern for SRS transmissions across multiple SRS transmission occasions for a UE 115, the hopping pattern comprising a different comb offset applied for each SRS transmission occasion. The network entity 105 may transmit signaling identifying a SRS configuration, the SRS configuration indicating at least a SRS comb offset hopping configuration for the hopping pattern. The network entity 105 may receive the SRSs across multiple SRS transmission occasions according to the SRS configuration and the hopping pattern.

Figure 2:
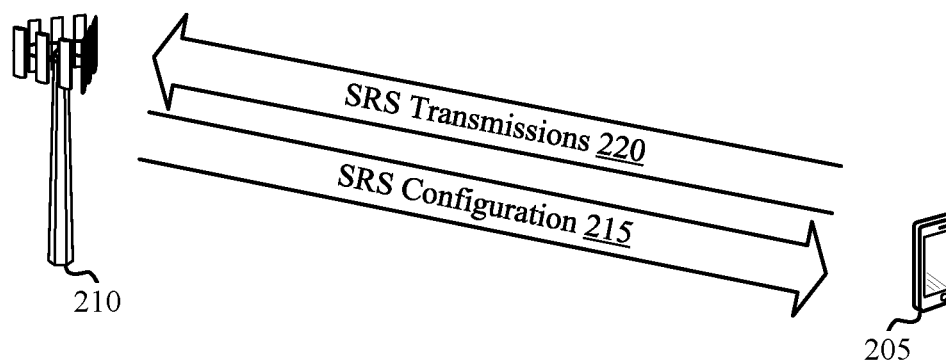
FIG. 2 illustrates an example of a wireless communications system that supports comb offset hopping for SRS transmissions in accordance with one or more aspects of the present disclosure.
Figure 2:
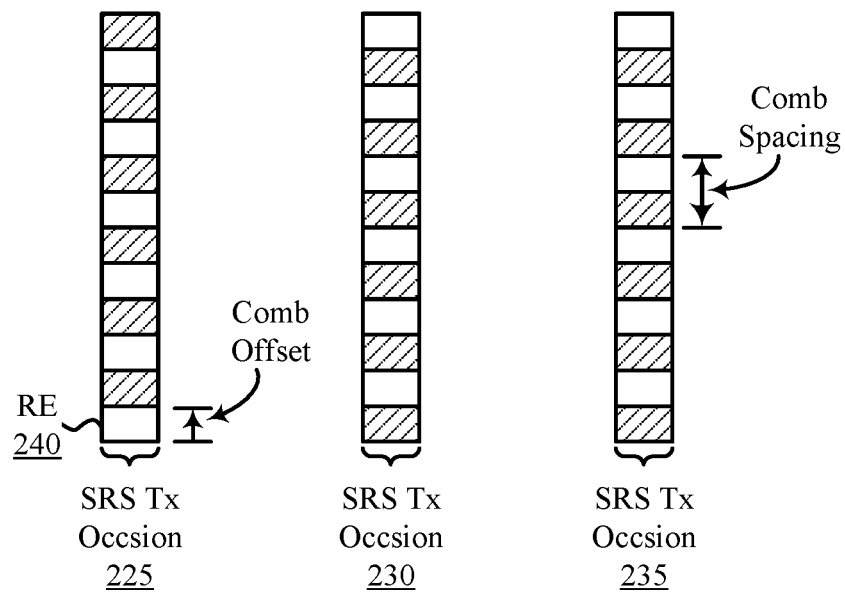
Figure 2:

FIG. 2 illustrates an example of a wireless communications system 200 that supports comb offset hopping for SRS transmissions in accordance with one or more aspects of the present disclosure. Wireless communications system 200 may implement aspects of wireless communications system 100. Wireless communications system 200 may include UE 205 and/or network entity 210, which may be examples of the corresponding devices described herein.

Wireless communications system 200 may support UE 205 performing a SRS transmission to network entity 210, such as a cell, TRP, and the like, associated with the network entity 210. For example, network entity 210 may configure UE 205 with SRS resource(s)/resource set(s) identifying the resources and/or parameters to be used for the SRS transmissions. In some examples, this may include the SRS configuration identifying a comb spacing for the SRS transmissions (e.g., the separation between SRS transmissions within a symbol), the SRS comb offset (e.g., the starting subcarrier within a RB relative to a base subcarrier index, such as subcarrier 0), and the like.

For example, the comb spacing (e.g., variable $K_{TC}$) may be configured as 2, 4, or 8 per SRS resource, which generally defines the spacing between two SRS resource elements (REs) 240 in a given OFDM symbol (which may be an example of a SRS transmission (Tx) occasion, in some examples). That is, the comb spacing may generally define the number of subcarriers separating two SRS transmissions during the OFDM symbol (e.g., SRS Tx occasion). For example, when every other RE 240 is configured with an SRS transmission, the comb spacing can be considered two. When every fourth RE 240 is configured with an SRS transmission, the comb spacing can be considered four.

The comb offset (e.g., variable $\overline{K}_{TC}$) may be configured as $0, 1, \ldots, K_{TC}-1$ per SRS resource, which generally defines the SRS REs (e.g., the starting RE, the SRS transmissions occupy every $K_{TC}$ RE within the sounding bandwidth once the starting RE is determined). That is, the SRS transmissions may span a given bandwidth (e.g., the bandwidth being sounded) that includes one or more resource blocks (RBs), with each RB including 12 (or some other number) of subcarriers or tones in one OFDM symbol. Within the bandwidth, the first RE in the frequency domain including an SRS transmission may be defined as the comb offset relative to the RB having the lowest index, the lowest subcarrier index, and the like. For example, in the RB having the lowest index within the sounding bandwidth, the subcarrier/tone having the lowest index within the RB may be considered the marker from which the comb offset is measured.

As non-limiting examples, SRS Tx occasion 225 may have a comb spacing of two and a comb offset of one, SRS Tx occasion 230 may have a comb spacing of two and a comb offset of zero, and SRS Tx occasion 235 may have a comb spacing of two and a comb offset of two.

Network entity 210 may generally use configuration signaling (e.g., RRC signaling) to configure UE 205 with the SRS configuration 215. In some aspects, this may include the SRS configuration 215 including various parameters (such as comb offset, comb spacing, etc.) that are based on various formulas. For example, the starting RE 240/comb offset may generally be signaled as the frequency domain starting position $k_0^{p_i}$ where $k_0^{p_i} = k_0^{-(p_i)} + n_{offset}^{FH} + n_{offset}^{RPFS}$. In some aspects, $k_0^{-(p_i)} = n_{shift} N_{SC}^{RB} + (k_{TC}^{-(p_i)} + k_{offset}^{l'})$ mod $K_{TC}$. In some aspects, $$k_{TC}^{(p_i)} = \begin{cases} (\bar{k}_{TC} + K_{TC}/2) \bmod K_{TC} & \text{if } N_{ap}^{SRS} = 4,\, p_i \in \{1001, 1003\}, \\ & \text{and } n_{SRS}^{cs,max} = 6 \\ (\bar{k}_{TC} + K_{TC}/2) \bmod K_{TC} & \text{if } N_{ap}^{SRS} = 4,\, p_i \in \{1001, 1003\}, \\ & \text{and } n_{SRS}^{cs} \in \{n_{SRS}^{cs,max}/2, \ldots, n_{SRS}^{cs,max} - 1\} \\ \bar{k}_{TC} & \text{otherwise} \end{cases}$$

In some aspects, the comb offset $k_{offset}^{l'}$ for an SRS resource is defined as a function of $K_{TC}$ and l'. For example, $K_{TC}$ may be signaled in the SRS configuration 215 as 2, 4, 8, etc., which is generally used by UE 205 to determine the comb offset applied to the SRS transmissions 220.

In the situation of a multi-port SRS resource, all ports may be configured on the same REs/comb offset, although two exceptions may exist. The first exception may include four SRS ports with a comb spacing being eight (e.g., where the maximum number of cyclic shifts is six). The next exception may include four SRS ports when the configured cyclic shift is the second half.

Accordingly, the parameter $k_{offset}^{l'}$ is conventionally used for SRS positioning (e.g., to have a sample of all SRS REs 240 within different symbols of the same resource. Other than for SRS positioning, this parameter is set to zero. In the case where the SRS transmissions 220 are used for positioning, this may be applied for SRS staggering. However, SRS staggering is different from SRS hopping which may be based on a pseudo-random sequence (e.g., to mitigate interference cause by the SRS transmissions).

That is, the SRS configuration 215 and/or other configuration information may generally include multiple base sequences being configured. For example, multiple base sequences $\bar{r}_{u,v}(n)$ of flexible length are available and/or may otherwise be configured. The multiple sequences for a given length may be organized into 30 different sequence groups where $u \in \{0,1, \ldots, 29\}$ indexes a sequence group, and $v \in \{0,1\}$ indexes the sequences within a group (at most 2, in some examples). The number of sequences per group may depend on the sequence length. For sequences of length longer than 72, there may be two sequences per group; otherwise, there may be one configured and v=0. In some aspects, different base sequences (different (u,v)) may not be completely orthogonal, but have low cross-correlation (e.g., the interference between SRSs of different base sequences at the receiver may be low).

Generally, the following determines the base sequence for a SRS transmission: the SRS sequence identity $n_{ID}^{SRS}$ configured per SRS resource and whether group hopping, sequence hopping, or neither is configured (configuration per SRS resource). In some aspects, neither: $u = n_{ID}^{SRS}$ mod 30 nor v=0 may indicate the base sequence is fixed across all OFDM symbols in all slots for SRS transmissions in that SRS resource. The network (e.g., via network entity 210) may carefully assign $n_{ID}^{SRS}$ to different SRS resources of different UEs across same/different cells to avoid interference (interference planning). For group hopping, the sequence index v=0 and the group index u may be pseudo-randomly selected in every OFDM symbol of the SRS resource and in every slot occupied by the resource. The pseudo-random sequence c(i) governing the group hopping may be initialized as $c_{init} = n_{ID}^{SRS}$ at the beginning of each radio frame. This may include interference randomization by hopping across 30 groups.

For sequence hopping, the group index $u = n_{ID}^{SRS}$ mod 30 may be the same as when hopping is not used. However, the sequence index v may be pseudo-randomly selected between 0 and 1 in every OFDM symbol of the SRS resource and in every slot occupied by the resource. Again, the pseudo-random sequence c(i) governing the sequence hopping may be initialized by $c_{init} = n_{ID}^{SRS}$ at the beginning of each radio frame. Interference randomization by hopping across two sequences with interference planning across groups may be supported. In some examples, if the variable grouporSequenceHopping equals 'neither,' then neither group nor sequence hopping may be used.

Accordingly, such networks (e.g., such as wireless communications system 200) may also configure the SRS transmissions 220 for group hopping and/or sequence hopping for the SRS transmissions 220 across multiple SRS Tx occasions, such as when different UE are configured for SRS transmissions to avoid/mitigate interference.

However, some wireless communications systems may support UE 205 being configured for SRS transmissions to multiple cells/TRPs. This may result in increased SRS transmissions within a given SRS occasion due to a large number of UE performing SRS transmission to different cells/TRPs. That is, coherence joint transmission (CJT) across multiple TRPs may be supported where different UE are configured for SRS transmissions across different SRS Tx occasions. This may result in multiple TRPs receiving SRS transmission 220 from a given UE. For a large number of UEs are configured for SRS transmissions, this may result in multiple UEs performing SRS transmissions during the same OFDM symbol. Interference randomization is more important to avoid/mitigate inter-cluster interference. Accordingly, existing interference randomization mechanism may include group hopping and sequence hopping (e.g., in the SRS base sequence domain). Some networks may also use cyclic shift hopping.

However and given the increased interference risk associated with such CJT techniques and/or in any situations where UE 205 is performing SRS transmissions 220 across multiple SRS Tx occasions, aspects of the techniques described herein generally introduce comb offset hopping to improve interference management techniques. That is, comb offset hopping may be useful for interference randomization, which may be used instead of and/or together with sequence hopping, group hopping, and/or cyclic shift hopping.

For example, UE 205 may be configured with comb offset hopping for SRS transmissions 220. This may include network entity 210 transmitting or otherwise conveying (and UE 205 receiving or otherwise obtaining) signaling identifying SRS configuration 215 for UE 205. In some examples, the signaling may include RRC signaling and/or other higher layer signaling. The SRS configuration 215 may be RRC signaling per SRS resource and/or per SRS resource set. In some examples, the SRS configuration 215 may include at least a SRS comb offset hopping configuration. For example, the SRS configuration 215 may carry otherwise convey an indication of whether or not SRS comb offset hopping is enabled or disabled for the SRS transmissions 220 configured by SRS configuration 215. Additionally, or alternatively, the SRS configuration 215 may carry or otherwise convey an indication of the SRS comb offset hopping configuration that identifies and/or otherwise enables determination of, when SRS comb hopping is enabled, the comb offset pattern to be used for/during SRS transmissions 220. Accordingly, UE 205 may identify, determine, or otherwise select the hopping pattern based on the SRS comb offset hopping configuration.

In some examples when SRS comb offset hopping is enabled, this may include the comb offset hopping pattern being indicated and/or otherwise determined based on a pseudo-random sequence with a certain initialization and as a function of time. For example, this may include adding SRS comb offset hopping terms and/or reuse the existing $k_{offset}^{l'}$ parameter when the SRS resource is not being configured for positioning, such as:

$$(k_{TC}^{(pi)} + k_{offset}^{l'} + f_{comboffset,hopping}(N_{s,f}^{\mu}, l')) \bmod K_{TC} \text{ or}$$

$$(k_{TC}^{(pi)} + k_{offset}^{l'}) \bmod K_{TC}, k_{offset}^{l'} = f_{comboffset,hopping}(n_{s,f}^{\mu}, l') \text{ if the SRS is not configured by the information element(IE)SRS-PosResource}$$

That is, the term $k_{TC}^{(pi)}$ may be based on the existing formula (e.g., based on existing configuration of CombOffset ($\overline{k}_{TC}$) and the port number, such as in the case of 4 SRS ports). The term $f_{comboffset,hopping}(n_{s,f}^{\mu}, l')$ may identify or otherwise indicate the SRS comb offset hopping formula, which may be a function of time (e.g., slot number, symbol number, etc.) and may be determined based on the pseudo-random sequence c(i).

Accordingly, UE 205 may identify, determine, or otherwise select the hopping pattern for the SRS transmission 220 across multiple SRS Tx occasions. Broadly, the hopping pattern may include a different comb offset being applied for each SRS Tx occasion. In the non-limiting example illustrated in FIG. 2, the SRS configuration 215 may configure three SRS Tx occasions, although the SRS configuration 215 may configure a different number of SRSTx occasions. Broadly, each SRS Tx occasion may correspond to symbol(s) within a slot, symbol(s) across multiple slots (e.g., consecutive slots), slot(s) within a subframe (e.g., a cellular radio access technology (RAT) radio subframe), slots across multiple subframes (e.g., consecutive subframes), and/or subframes within a frame. In the non-limiting example illustrated in FIG. 2, the SRS configuration 215 may configure UE 205 to perform SRS transmissions 220 (e.g., including one or more SRS signals 245) during SRS Tx occasion 225, during SRS Tx occasion 230, and during SRS Tx occasion 235.

As discussed, the hopping pattern may include a different comb offset being applied for each SRS Tx occasion. In the non-limiting example illustrated in FIG. 2, the hopping pattern may include a comb offset of one being applied during SRS Tx occasion 225, a comb offset of zero being applied during SRS Tx occasion 230, and a comb offset of zero being applied during SRS Tx occasion 235. Accordingly, UE 205 may transmit the SRS (e.g., SRS signals 245) across the plurality of SRS Tx occasions according to the SRS configuration (e.g., using various parameters indicated in the SRS configuration) and the hopping pattern.

Generally, various examples may be considered for the SRS comb offset hopping formula. That is, various examples of how to signal, identify, indicate, or otherwise convey the hopping pattern for the SRS transmissions 220. A first option may include the SRS comb offset hopping formula (e.g., the SRS comb offset hopping configuration) being a function of the slot number within a radio frame and the symbol number within the slot. That is, UE 205 and/or network entity 210 may select, identify, or otherwise determine a slot number within a radio frame and a symbol number within a slot (e.g., the slot corresponding to the slot number). For example, the different symbols within the same SRS resource may have different comb offsets that are based on a pseudo-random sequence. This may be indicated in the comb offset hopping configuration based on:

$$f_{comboffset,hopping}(n_{s,f}^{\mu}, l') = \left(\sum_{m=0}^{M-1} \underbrace{c}_{\substack{pseudo-random \\ sequence}} \left( M \cdot \left( \underbrace{\underbrace{n}_{\substack{Slot\ number \\ within\ frame_{s,f}}}^{\mu} N_{symb}^{slot}}_{} + \underbrace{\underbrace{l_0}_{\substack{First\ symbol\ of\ SRS \\ resource\ within\ the\ slot}} + \underbrace{l'}_{\substack{Symbol\ number\ within\ SRS \\ resource}}}_{Symbol\ number\ within\ slot} \right) + m \right) \cdot 2^m \right) \bmod K_{TC}$$

Accordingly, in this first option the slot number within the radio frame and the symbol number within the slot may be parameters utilized by UE 205 to identify, select, or otherwise determine the hopping pattern of comb offsets to be applied during each SRS Tx occasion. In some examples, the hopping pattern may define different comb offsets being applied for different symbols within the slot, where each symbol corresponds to one of SRS Tx occasion 225, SRS Tx occasion 230, and SRS Tx occasion 235.

A second option may include the SRS comb offset hopping formula (e.g., the SRS comb offset hopping configuration) being a function of the slot number within a radio frame. That is, UE 205 and/or network entity 210 may select, identify, or otherwise determine a slot number within a radio frame. For example and within a given slot, the comb offset hopping pattern may not change for a given SRS resource. However, in different instances of the SRS resource in different slots the comb offset may be the same. This may be indicated in the comb offset hopping configuration based on:

$$f_{comboffset,hopping}(n_{s,f}^{\mu}) = \left(\sum_{m=0}^{M-1} c(M \cdot n_{s,f}^{\mu} + m) \cdot 2^m \right) \bmod K_{TC}$$

Accordingly, in this second option the slot number within the radio frame may be functions utilized by UE 205 to identify, select, or otherwise determine the hopping pattern of comb offsets to be applied during each SRS Tx occasion. In some examples, the hopping pattern may define the same comb offsets being applied for different symbols within the slot, where each symbol corresponds to one of SRS Tx occasion 225, SRS Tx occasion 230, and SRS Tx occasion 235.

A third option may include the SRS comb offset hopping formula (e.g., the SRS comb offset hopping configuration) being a function of the slot number within a radio frame and a starting symbol. That is, UE 205 and/or network entity 210 may select, identify, or otherwise determine a slot number within a radio frame and a starting symbol. For example and within a given slot, the comb offset hopping pattern may not change for a given SRS resource. However, in different instances of the SRS resource in different slots the comb offset may be different. Moreover, the function may also be a function of a symbol within the slot. This may be indicated in the comb offset hopping configuration based on:

$$f_{comboffset,hopping}(n_{s,f}^{\mu}) = \left(\sum_{m=0}^{M-1} c(M \cdot (n_{s,f}^{\mu} N_{symb}^{slot} + l_0) + m) \cdot 2^m \right) \bmod K_{TC}$$

Accordingly, in this third option the slot number within the radio frame as well as the starting symbol (e.g., the first symbol of the SRS resource within the slot) may be functions utilized by UE 205 to identify, select, or otherwise determine the hopping pattern of comb offsets to be applied during each SRS Tx occasion. In some examples, the hopping pattern may define the same comb offsets being applied for different symbols within the slot, where each symbol corresponds to one of SRS Tx occasion 225, SRS Tx occasion 230, and SRS Tx occasion 235.

As also discussed above, aspects of the comb offset hopping configuration may be based on a pseudo-random sequence initialization (e.g., a sequence initialization indicator). That is, aspects of the hopping pattern defined based on the comb offset hopping configuration may be based, at least to some degree, on the random sequence indicated in the configuration signaling (or other signaling). Accordingly, aspects of the techniques described herein also provide various mechanisms for initialization of the pseudo-random sequence initialization. In some examples, initialization of the pseudo-random sequence may occur at the beginning of each radio frame.

A first initialization option may include the pseudo-random sequence being initialized by $c_{init}=n_{ID}^{SRS}$ (e.g., the SRS sequence identity, which may generally include any identifier associated with the SRS configuration) configured for the SRS resource. This may ensure that all SRS resources across all UEs with the same base sequence (which is based on same $n_{ID}^{SRS}$) will hop consistently to ensure orthogonality by maintaining different comb offsets (e.g., if the UEs have different comb offsets in a first instance, the UEs may also have different comb offsets in another instance), and those with different base sequence may hop in a pseudo-random manner to randomize interference. In some examples, the network may configure the same $n_{ID}^{SRS}$ for intra-cell or intra-cluster SRS transmissions, and different $n_{ID}^{SRS}$ for inter-cell or inter-cluster SRS transmissions. Accordingly, the hopping pattern may be identified or otherwise selected based on the sequence initialization indicator.

A second initialization option may include the pseudo-random sequence being initialized by $c_{init}=n_{ID}^{SRS}*n_{SRS}^{cs,max}+n_{SRS}^{cs}$ or $c_{init}=n_{SRS}^{cs}*n_{ID,max}^{SRS}+n_{ID}^{SRS}$, where $n_{SRS}^{cs,max}$ is the maximum number of cyclic shifts (e.g., may depend on comb spacing $K_{TC}$), $n_{SRS}^{cs}$ is the configured cyclic shift, and $n_{ID,max}^{SRS}$ is the maximum number of SRS sequence identities (e.g., 1024). This is similar to the first initialization option, expect that the comb offset hopping consistency may be ensured if both the SRS sequence identity and cyclic shifts are the same (in this case, it may be helpful to always have different comb offsets if they are in the same symbol). If any of these two are different, the pseudo-random sequence initialization ensures interference randomization. Accordingly, the hopping pattern may be identified or otherwise selected based on the sequence initialization indicator and the cyclic shift information in this second option.

Figure 3:
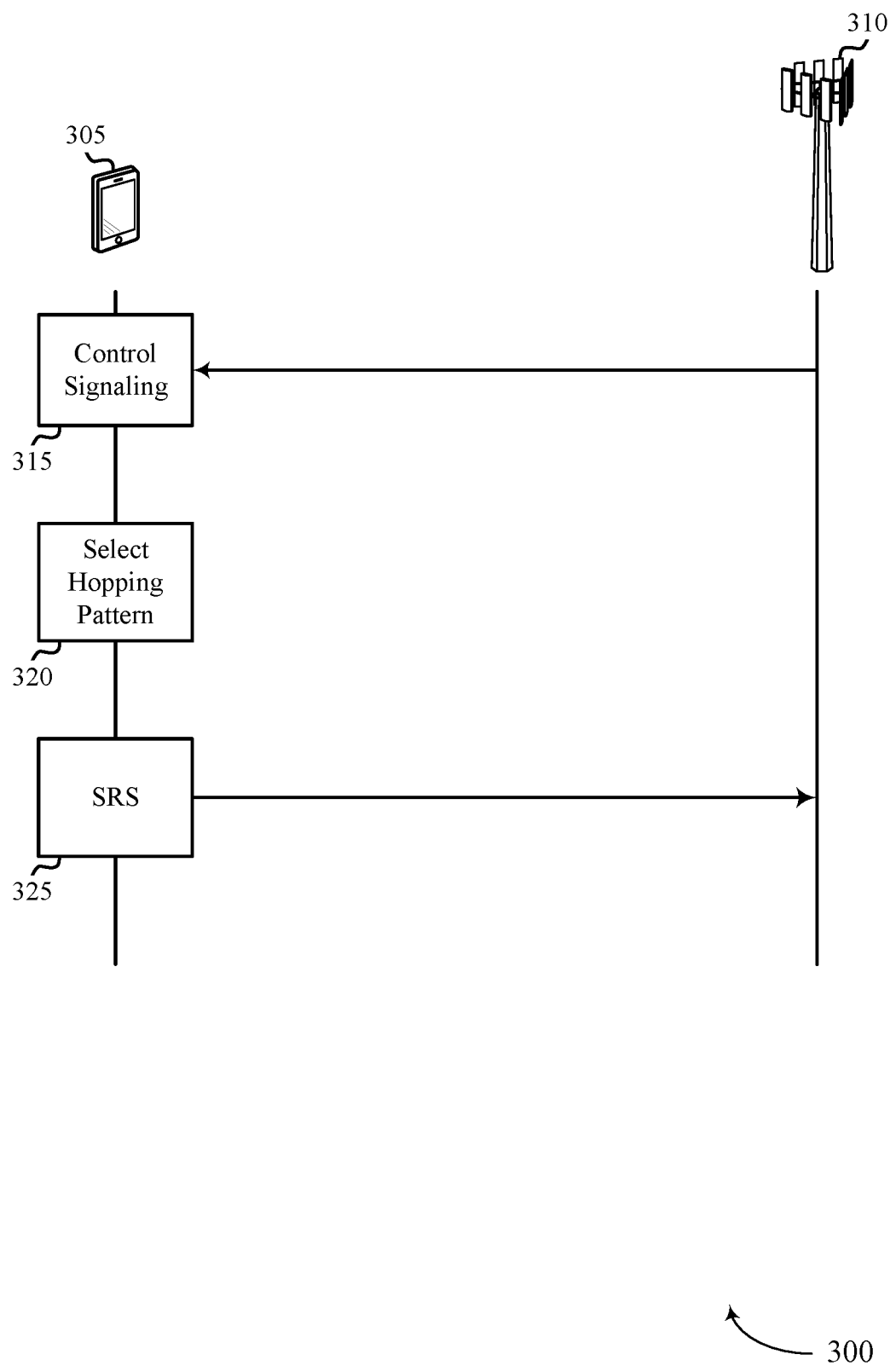
FIG. 3 illustrates an example of a process that supports comb offset hopping for SRS transmissions in accordance with one or more aspects of the present disclosure.

FIG. 3 illustrates an example of a process 300 that supports comb offset hopping for SRS transmissions in accordance with one or more aspects of the present disclosure. Process 300 may implement aspects of wireless communications systems 100 and/or 200. Aspects of process 300 may be implemented by or implemented at UE 305 and/or network entity 310, which may be examples of the corresponding devices described herein.

At 315, network entity 310 may transmit or otherwise provide (and UE 305 may receive or otherwise obtain) control signaling. In some examples, the control signaling may be RRC signaling. In some examples, the control signaling may carry or otherwise convey information identifying a SRS configuration. In some examples, the SRS configuration may be for UE 305 to perform SRS transmissions during SRS Tx occasions. In some examples, the SRS configuration may include a SRS comb offset hopping configuration.

At 320, UE 305 may identify, select, or otherwise determine a hopping pattern. In some examples, the hopping pattern may be determined based on the SRS configuration. In some examples, the hopping pattern may be determined based on the SRS comb offset hopping configuration. In some examples, the hopping pattern may include different comb offset(s). In some examples, the different comb offsets may include different comb offsets being applied. In some examples, the different comb offsets may be applied during different SRS Tx occasions. The different SRS Tx occasions may include different symbols within a slot, different slots within a subframe, different slots within a frame, different subframes within a frame, and the like.

In some aspects, the comb offset hopping configuration may be based on a slot number within a radio frame and a symbol number within a slot (e.g., the slot corresponding to the slot number). In some examples, the SRS Tx occasions may be based on the radio frame and the slot. In some examples, UE 305 and/or network entity 310 may identify or otherwise select the hopping pattern for the SRS transmissions based on the radio frame and the slot. In some examples, the hopping pattern may define different or the same comb offsets for different symbols. The different symbols may be within a slot (e.g., the slot corresponding to the slot number) and/or across multiple slots (e.g., consecutive or non-consecutive slots).

In some aspects, the comb offset hopping configuration may be based on a slot number within a radio frame. In some examples, the SRS Tx occasions may be based on the radio frame. In some examples, UE 305 and/or network entity 310 may identify or otherwise select the hopping pattern for the SRS transmissions based on the radio frame. In some examples, the hopping pattern may define different or the same comb offsets for different symbols (e.g., for different SRS Tx occasions). The different symbols may be within a slot and/or across multiple slots.

In some aspects, the comb offset hopping configuration may be based on a slot number within a radio frame and a starting symbol (e.g., the first symbols of the SRS resource within the slot). In some examples, the SRS Tx occasion may be based on the radio frame and the starting symbol. In some examples, UE 305 and/or network entity 310 may identify or otherwise select the hopping pattern for the SRS transmissions based on the radio frame and the starting symbol. In some examples, the hopping pattern may define different or the same comb offsets for different symbols (e.g., for different SRS Tx occasions). The different symbols may be within a slot and/or across multiple slots.

At 325, UE 305 may transmit or otherwise convey SRS transmissions. In some examples, the SRS transmissions may be performed according to the SRS configuration. In some examples, the SRS transmissions may be performed according to the SRS comb offset hopping configuration. In some examples, each SRS transmission within a given SRS Tx occasion may include SRS transmissions using a comb offset. In some examples, SRS transmissions across different SRS Tx occasion may include SRS transmissions using different comb offsets.

Figure 4:
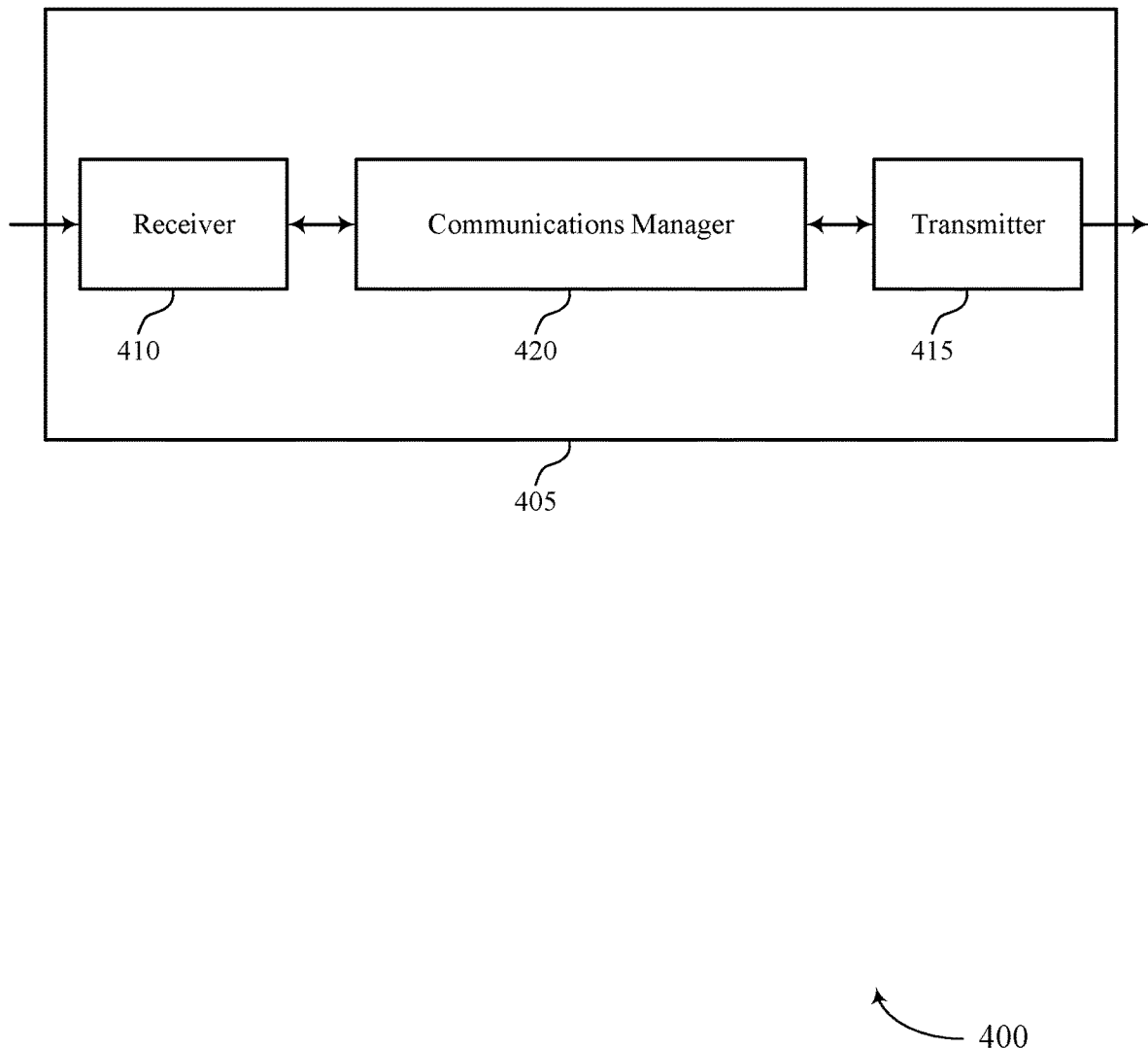
FIGS. 4 and 5 show block diagrams of devices that support comb offset hopping for SRS transmissions in accordance with one or more aspects of the present disclosure.

FIG. 4 shows a block diagram 400 of a device 405 that supports comb offset hopping for SRS transmissions in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to comb offset hopping for SRS transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to comb offset hopping for SRS transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of comb offset hopping for SRS transmissions as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for receiving signaling identifying a SRS configuration for the UE, the SRS configuration indicating at least a SRS comb offset hopping configuration. The communications manager 420 may be configured as or otherwise support a means for selecting, based on the comb offset hopping configuration, a hopping pattern for SRS transmissions across multiple SRS transmission occasions, the hopping pattern including a different comb offset applied for each SRS transmission occasion. The communications manager 420 may be configured as or otherwise support a means for transmitting the SRSs across multiple SRS transmission occasions according to the SRS configuration and the hopping pattern.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for configuring SRS comb offset hopping across multiple SRS Tx occasions to improve interference management techniques based on pseudo-random sequence initialization.

Figure 5:
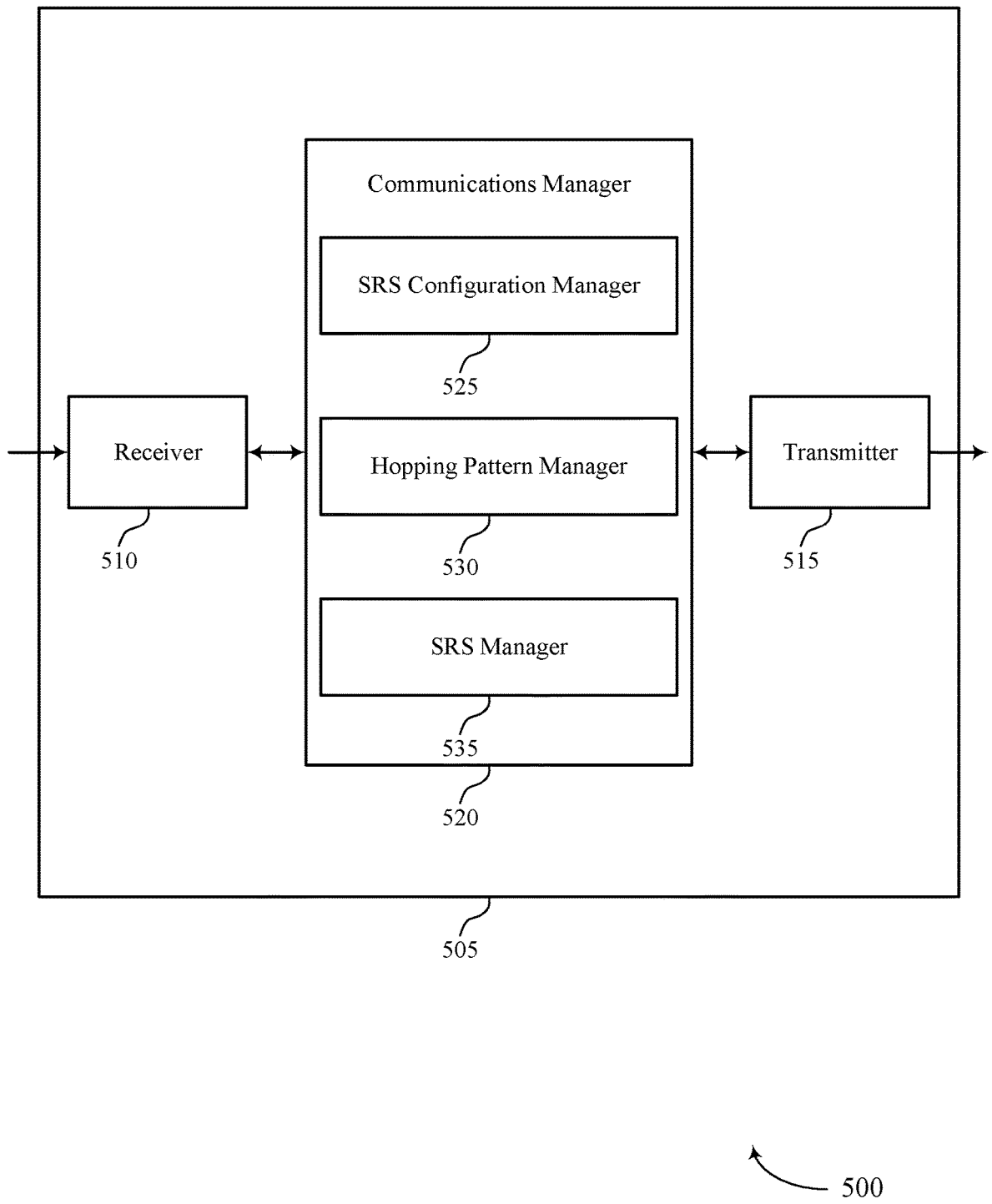

FIG. 5 shows a block diagram 500 of a device 505 that supports comb offset hopping for SRS transmissions in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to comb offset hopping for SRS transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to comb offset hopping for SRS transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of comb offset hopping for SRS transmissions as described herein. For example, the communications manager 520 may include an SRS configuration manager 525, a hopping pattern manager 530, an SRS manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The SRS configuration manager 525 may be configured as or otherwise support a means for receiving signaling identifying a SRS configuration for the UE, the SRS configuration indicating at least a SRS comb offset hopping configuration. The hopping pattern manager 530 may be configured as or otherwise support a means for selecting, based on the comb offset hopping configuration, a hopping pattern for SRS transmissions across multiple SRS transmission occasions, the hopping pattern including a different comb offset applied for each SRS transmission occasion. The SRS manager 535 may be configured as or otherwise support a means for transmitting the SRSs across multiple SRS transmission occasions according to the SRS configuration and the hopping pattern.

Figure 6:
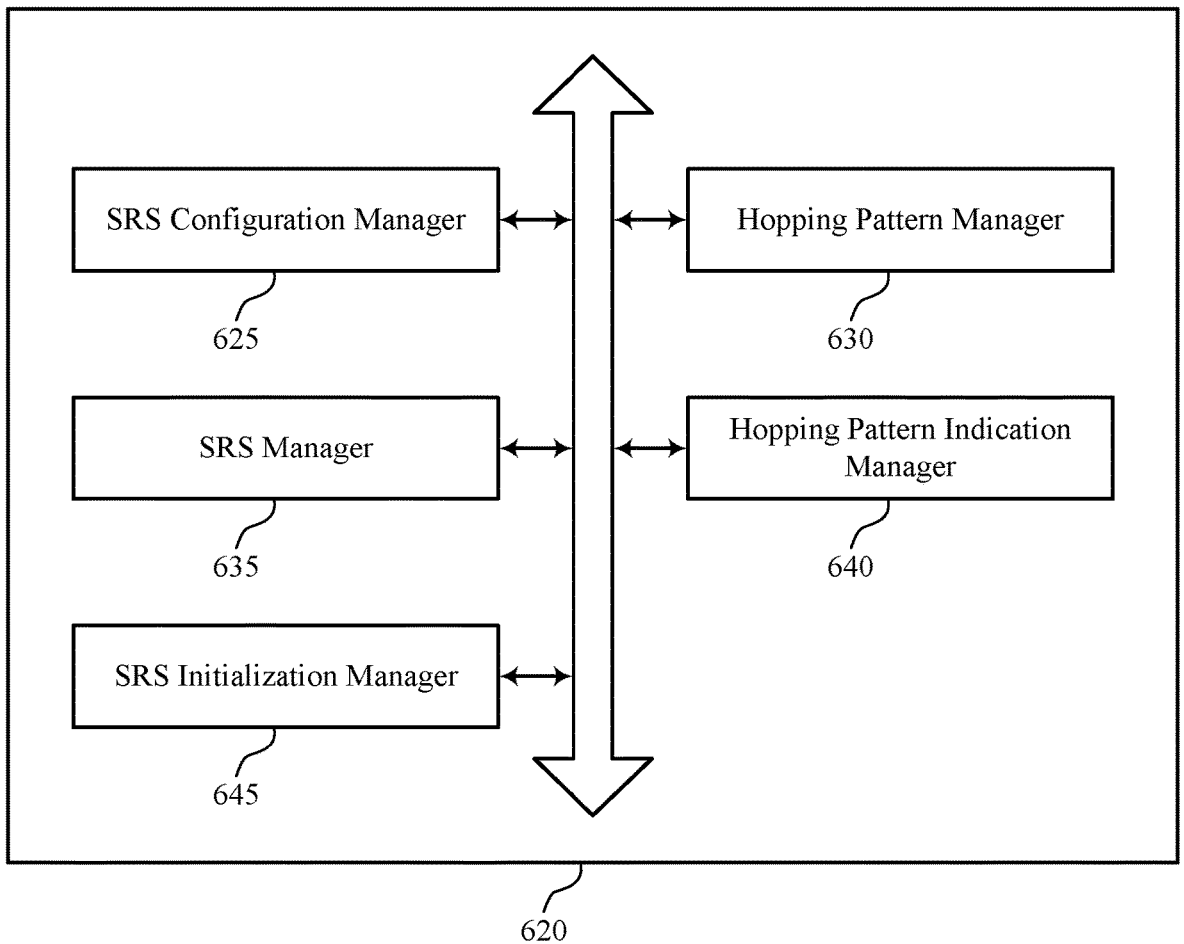
FIG. 6 shows a block diagram of a communications manager that supports comb offset hopping for SRS transmissions in accordance with one or more aspects of the present disclosure.

FIG. 6 shows a block diagram 600 of a communications manager 620 that supports comb offset hopping for SRS transmissions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of comb offset hopping for SRS transmissions as described herein. For example, the communications manager 620 may include an SRS configuration manager 625, a hopping pattern manager 630, an SRS manager 635, a hopping pattern indication manager 640, an SRS initialization manager 645, or any combination thereof. Each of these components may communicate, directly or indirectly, with one another (e.g., via one or more buses).

The communications manager 620 may support wireless communication at a UE in accordance with examples as disclosed herein. The SRS configuration manager 625 may be configured as or otherwise support a means for receiving signaling identifying a SRS configuration for the UE, the SRS configuration indicating at least a SRS comb offset hopping configuration. The hopping pattern manager 630 may be configured as or otherwise support a means for selecting, based on the comb offset hopping configuration, a hopping pattern for SRS transmissions across multiple SRS transmission occasions, the hopping pattern including a different comb offset applied for each SRS transmission occasion. The SRS manager 635 may be configured as or otherwise support a means for transmitting the SRSs across multiple SRS transmission occasions according to the SRS configuration and the hopping pattern.

In some examples, the hopping pattern indication manager 640 may be configured as or otherwise support a means for identifying, based on the comb offset hopping configuration, a slot number within a radio frame and a symbol number within a slot, where the multiple SRS transmission occasions are based on the radio frame and the slot, where the hopping pattern is selected based on the slot number within the radio frame and the symbol number within the slot. In some examples, the hopping pattern defines different comb offsets for different symbols within the slot.

In some examples, the hopping pattern indication manager 640 may be configured as or otherwise support a means for identifying, based on the comb offset hopping configuration, a slot number within a radio frame, where the multiple SRS transmission occasions are based on the radio frame, where the hopping pattern is selected based on the slot number within the radio frame. In some examples, the hopping pattern defines a same comb offset for different symbols within a slot of the radio frame.

In some examples, the hopping pattern indication manager 640 may be configured as or otherwise support a means for identifying, based on the comb offset hopping configuration, a slot number within a radio frame and a starting symbol, where the multiple SRS transmission occasions are based on the radio frame and the starting symbol, where the hopping pattern is selected based on the slot number within the radio frame and the starting symbol. In some examples, the hopping pattern defines a same comb offset for different symbols within a slot of the radio frame.

In some examples, the SRS initialization manager 645 may be configured as or otherwise support a means for identifying, based on the comb offset hopping configuration, a sequence initialization indicator associated with an identifier of the SRS configuration, where the hopping pattern is selected based on the sequence initialization indicator. In some examples, the SRS initialization manager 645 may be configured as or otherwise support a means for identifying, based on the comb offset hopping configuration, a cyclic shift information associated with the SRS configuration, where the hopping pattern is selected based on the sequence initialization indicator and the cyclic shift information. In some examples, the signaling includes RRC signaling.

Figure 7:
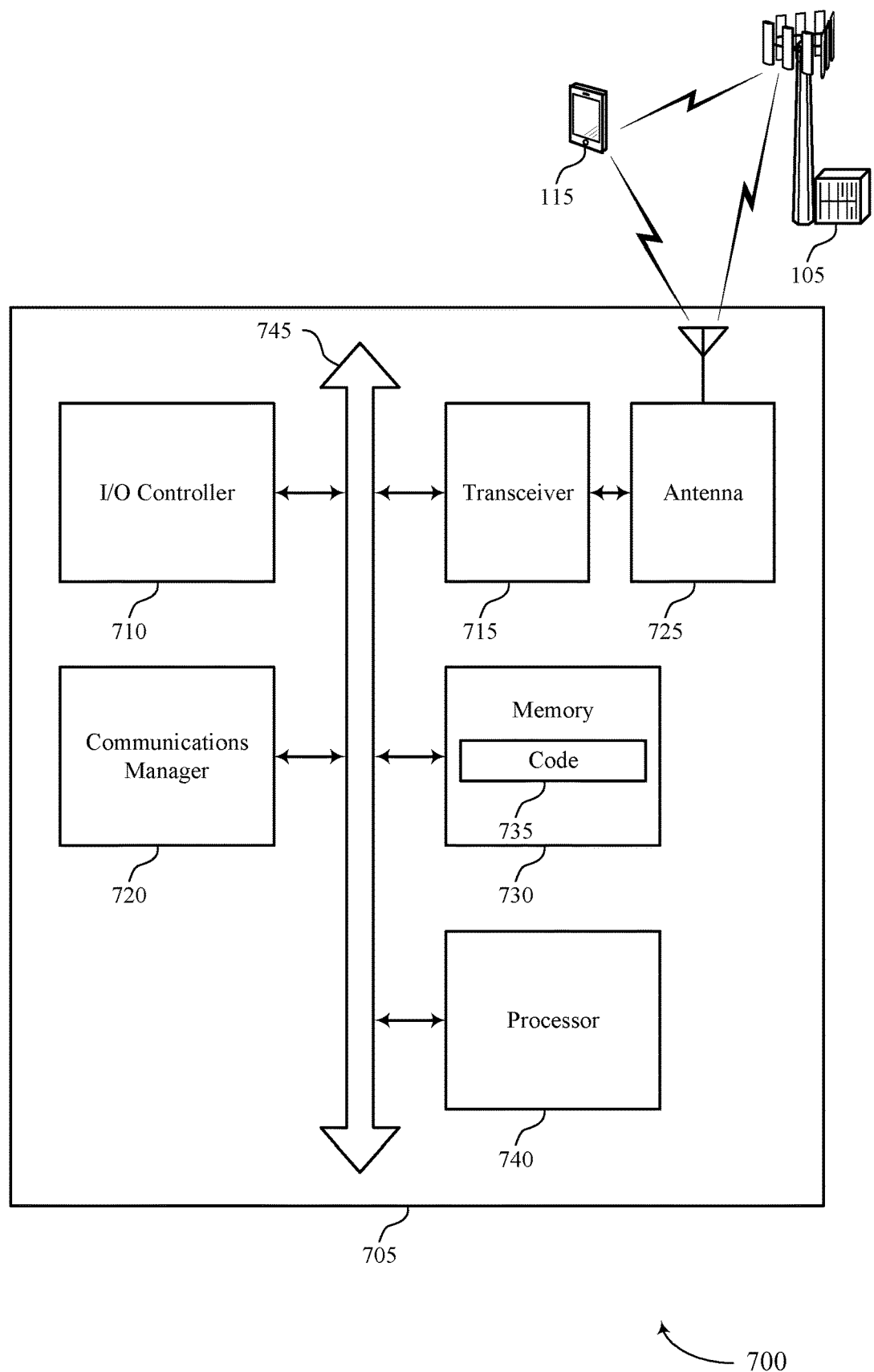
FIG. 7 shows a diagram of a system including a device that supports comb offset hopping for SRS transmissions in accordance with one or more aspects of the present disclosure.

FIG. 7 shows a diagram of a system 700 including a device 705 that supports comb offset hopping for SRS transmissions in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting comb offset hopping for SRS transmissions). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving signaling identifying a SRS configuration for the UE, the SRS configuration indicating at least a SRS comb offset hopping configuration. The communications manager 720 may be configured as or otherwise support a means for selecting, based on the comb offset hopping configuration, a hopping pattern for SRS transmissions across multiple SRS transmission occasions, the hopping pattern including a different comb offset applied for each SRS transmission occasion. The communications manager 720 may be configured as or otherwise support a means for transmitting the SRSs across multiple SRS transmission occasions according to the SRS configuration and the hopping pattern.

By including or configuring the communications manager 720 in accordance with examples as described herein, the device 705 may support techniques for configuring SRS comb offset hopping across multiple SRS Tx occasions to improve interference management techniques based on pseudo-random sequence initialization.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of comb offset hopping for SRS transmissions as described herein, or the processor 740 and the memory 730 may be otherwise configured to perform or support such operations.

Figure 8:
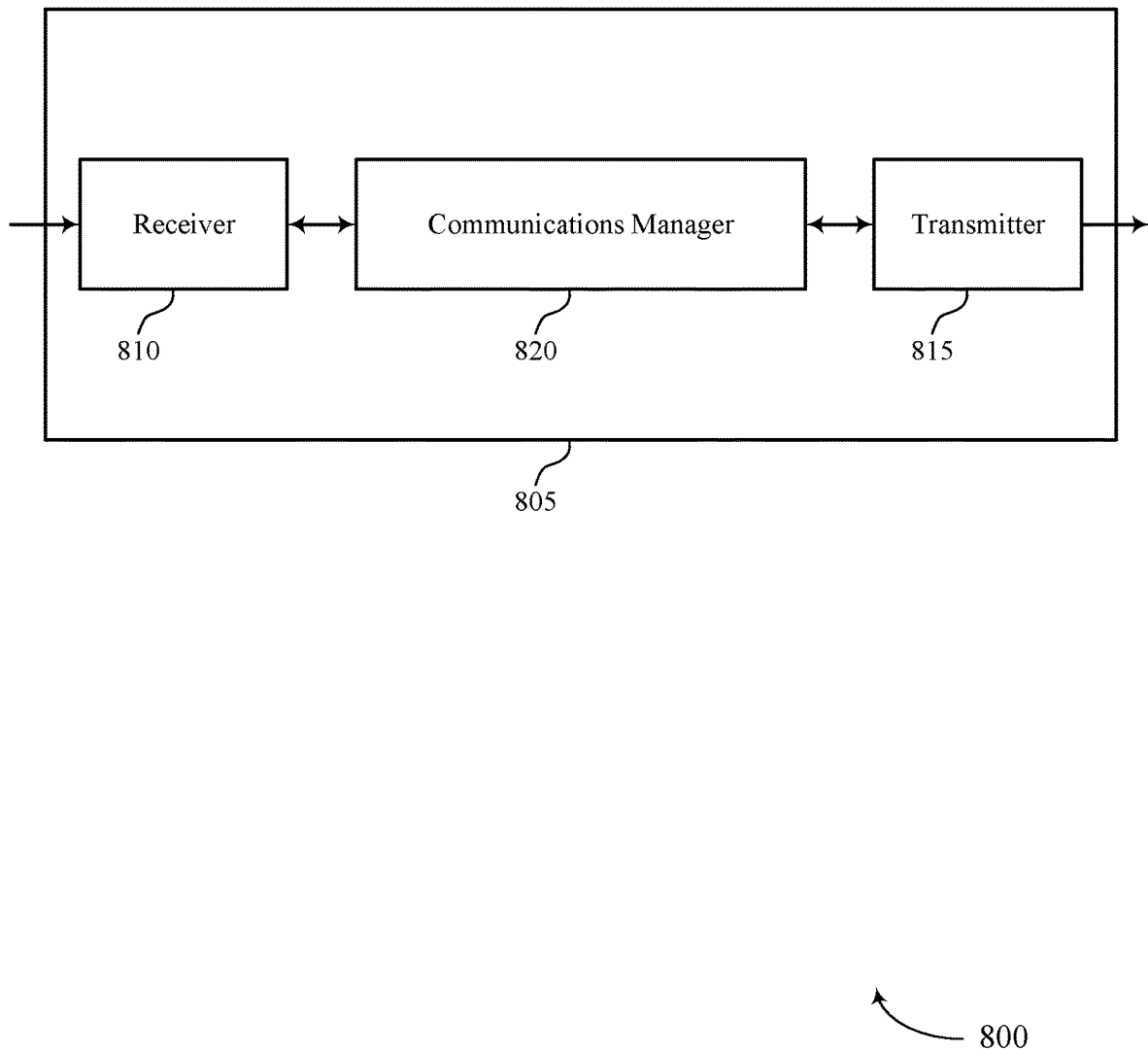
FIGS. 8 and 9 show block diagrams of devices that support comb offset hopping for SRS transmissions in accordance with one or more aspects of the present disclosure.

FIG. 8 shows a block diagram 800 of a device 805 that supports comb offset hopping for SRS transmissions in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of comb offset hopping for SRS transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for selecting, based on a comb offset hopping configuration, a hopping pattern for SRS transmissions across multiple SRS transmission occasions for a UE, the hopping pattern including a different comb offset applied for each SRS transmission occasion. The communications manager 820 may be configured as or otherwise support a means for transmitting signaling identifying a SRS configuration, the SRS configuration indicating at least a SRS comb offset hopping configuration for the hopping pattern. The communications manager 820 may be configured as or otherwise support a means for receiving the SRSs across multiple SRS transmission occasions according to the SRS configuration and the hopping pattern.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for configuring SRS comb offset hopping across multiple SRS Tx occasions to improve interference management techniques based on pseudo-random sequence initialization.

Figure 9:
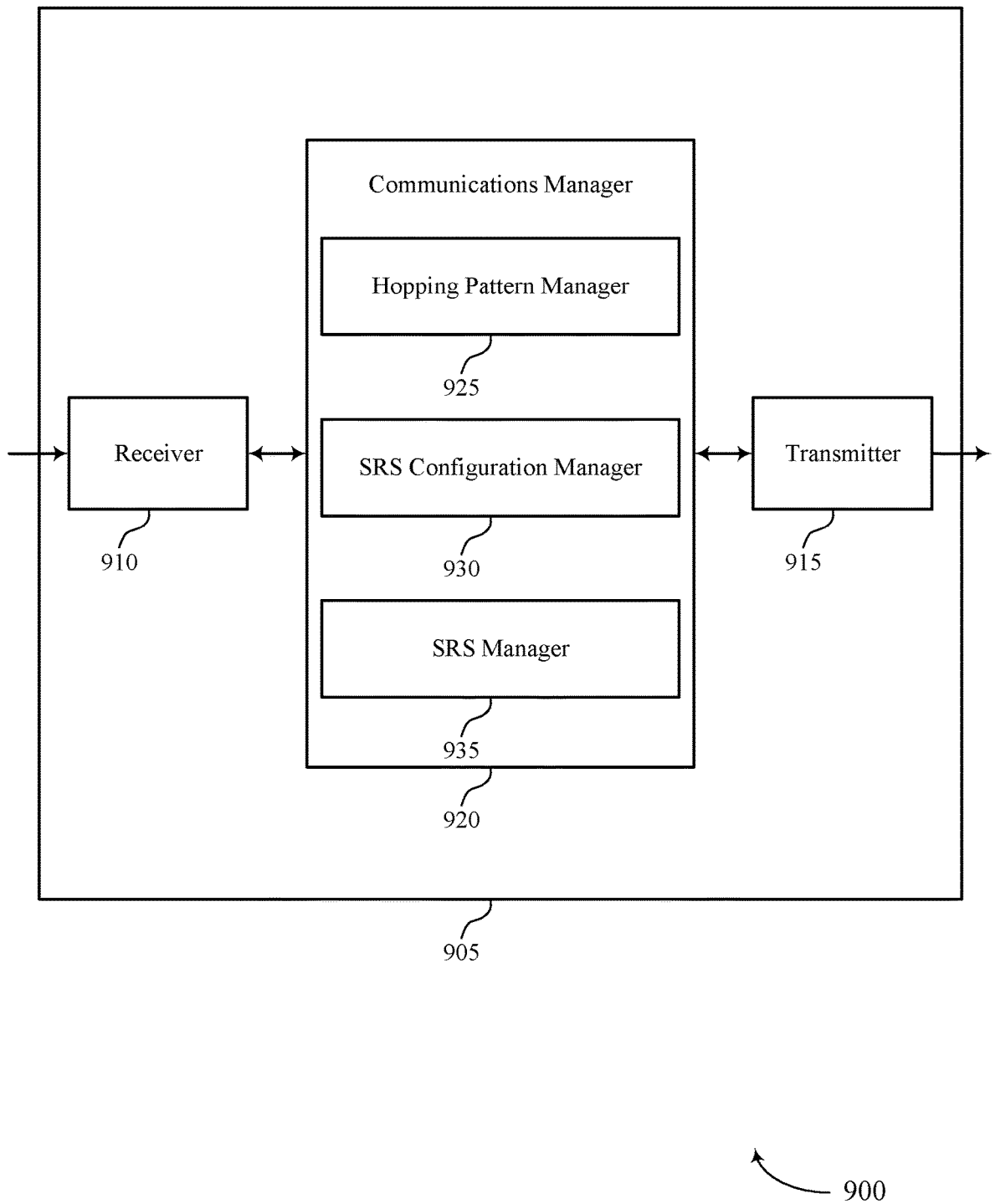

FIG. 9 shows a block diagram 900 of a device 905 that supports comb offset hopping for SRS transmissions in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of comb offset hopping for SRS transmissions as described herein. For example, the communications manager 920 may include a hopping pattern manager 925, an SRS configuration manager 930, an SRS manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The hopping pattern manager 925 may be configured as or otherwise support a means for selecting, based on a comb offset hopping configuration, a hopping pattern for SRS transmissions across multiple SRS transmission occasions for a UE, the hopping pattern including a different comb offset applied for each SRS transmission occasion. The SRS configuration manager 930 may be configured as or otherwise support a means for transmitting signaling identifying a SRS configuration, the SRS configuration indicating at least a SRS comb offset hopping configuration for the hopping pattern. The SRS manager 935 may be configured as or otherwise support a means for receiving the SRSs across multiple SRS transmission occasions according to the SRS configuration and the hopping pattern.

Figure 10:
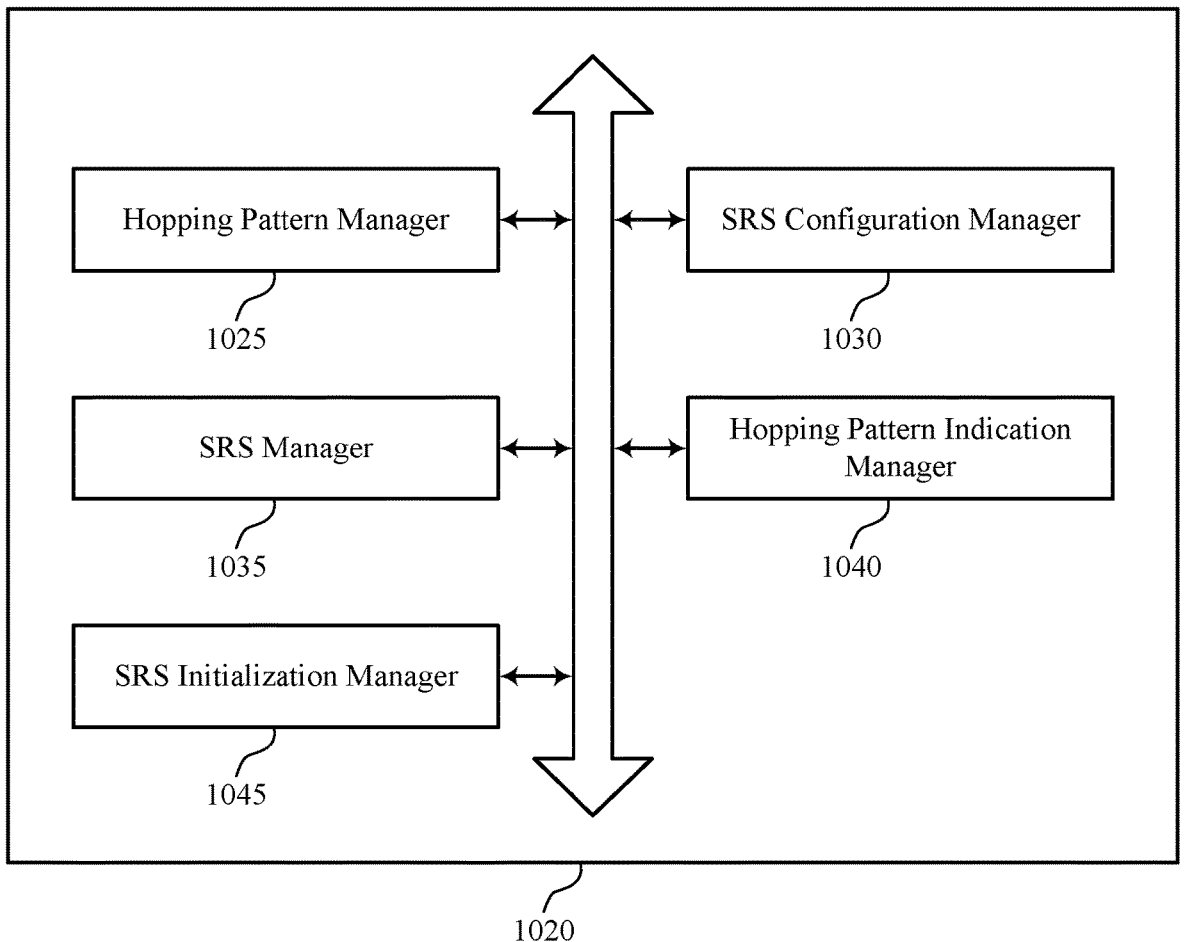
FIG. 10 shows a block diagram of a communications manager that supports comb offset hopping for SRS transmissions in accordance with one or more aspects of the present disclosure.

FIG. 10 shows a block diagram 1000 of a communications manager 1020 that supports comb offset hopping for SRS transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of comb offset hopping for SRS transmissions as described herein. For example, the communications manager 1020 may include a hopping pattern manager 1025, an SRS configuration manager 1030, an SRS manager 1035, a hopping pattern indication manager 1040, an SRS initialization manager 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The hopping pattern manager 1025 may be configured as or otherwise support a means for selecting, based on a comb offset hopping configuration, a hopping pattern for SRS transmissions across multiple SRS transmission occasions for a UE, the hopping pattern including a different comb offset applied for each SRS transmission occasion. The SRS configuration manager 1030 may be configured as or otherwise support a means for transmitting signaling identifying a SRS configuration, the SRS configuration indicating at least a SRS comb offset hopping configuration for the hopping pattern. The SRS manager 1035 may be configured as or otherwise support a means for receiving the SRSs across multiple SRS transmission occasions according to the SRS configuration and the hopping pattern.

In some examples, the hopping pattern indication manager 1040 may be configured as or otherwise support a means for identifying, based on the comb offset hopping configuration, a slot number within a radio frame and a symbol number within a slot, where the multiple SRS transmission occasions are based on the radio frame and the slot, where the hopping pattern is selected based on the slot number within the radio frame and the symbol number within the slot. In some examples, the hopping pattern defines different comb offsets for different symbols within the slot.

In some examples, the hopping pattern indication manager 1040 may be configured as or otherwise support a means for identifying, based on the comb offset hopping configuration, a slot number within a radio frame, where the multiple SRS transmission occasions are based on the radio frame, where the hopping pattern is selected based on the slot number within the radio frame. In some examples, the hopping pattern defines a same comb offset for different symbols within a slot of the radio frame.

In some examples, the hopping pattern indication manager 1040 may be configured as or otherwise support a means for identifying, based on the comb offset hopping configuration, a slot number within a radio frame and a starting symbol, where the multiple SRS transmission occasions are based on the radio frame and the starting symbol, where the hopping pattern is selected based on the slot number within the radio frame and the starting symbol. In some examples, the hopping pattern defines a same comb offset for different symbols within the slot.

In some examples, the SRS initialization manager 1045 may be configured as or otherwise support a means for identifying, based on the comb offset hopping configuration, a sequence initialization indicator associated with an identifier of the SRS configuration, where the hopping pattern is selected based on the sequence initialization indicator. In some examples, the SRS initialization manager 1045 may be configured as or otherwise support a means for identifying, based on the comb offset hopping configuration, a cyclic shift information associated with the SRS configuration, where the hopping pattern is selected based on the sequence initialization indicator and the cyclic shift information. In some examples, the signaling includes RRC signaling.

Figure 11:
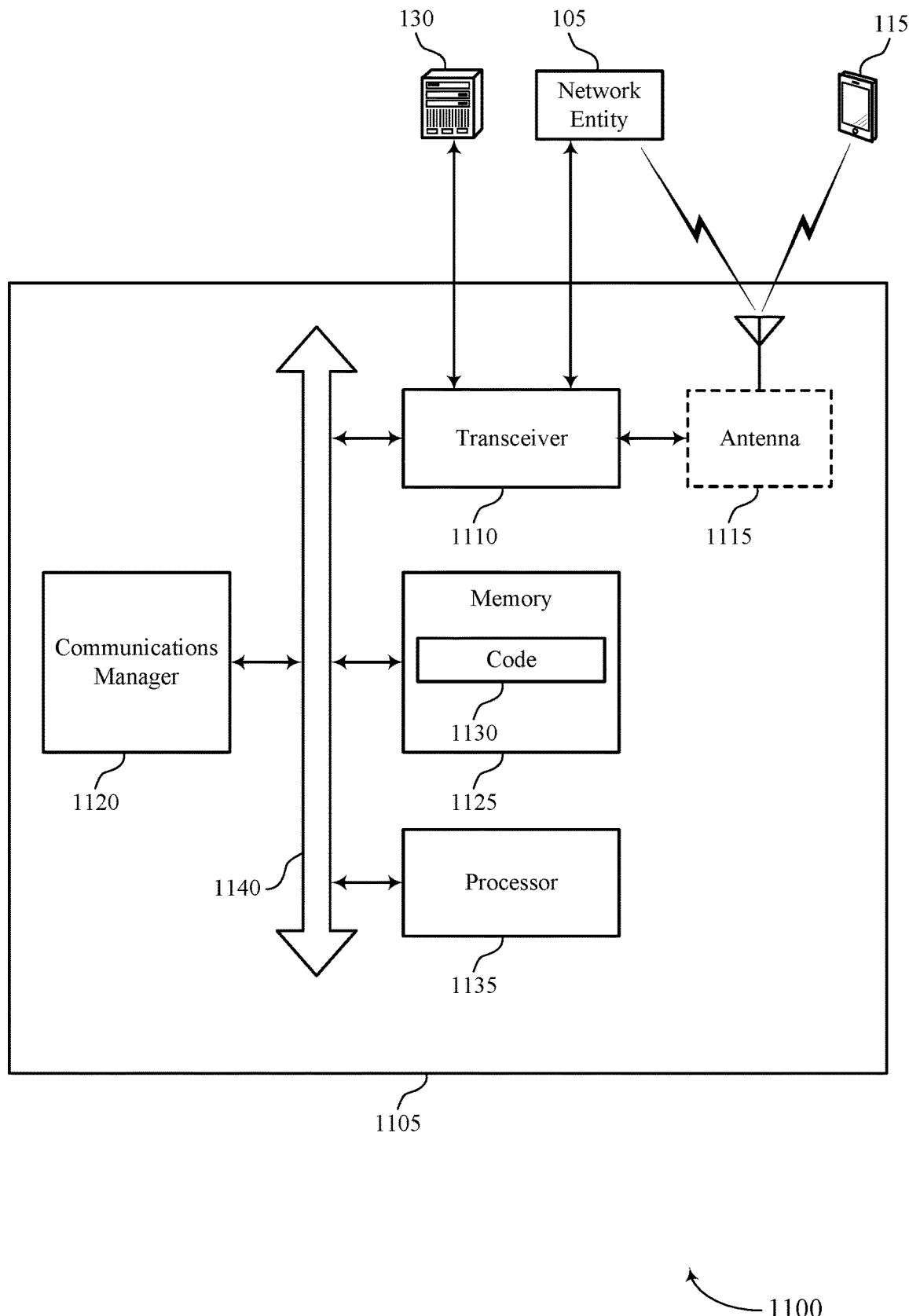
FIG. 11 shows a diagram of a system including a device that supports comb offset hopping for SRS transmissions in accordance with one or more aspects of the present disclosure.

FIG. 11 shows a diagram of a system 1100 including a device 1105 that supports comb offset hopping for SRS transmissions in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting comb offset hopping for SRS transmissions). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for selecting, based on a comb offset hopping configuration, a hopping pattern for SRS transmissions across multiple SRS transmission occasions for a UE, the hopping pattern including a different comb offset applied for each SRS transmission occasion. The communications manager 1120 may be configured as or otherwise support a means for transmitting signaling identifying a SRS configuration, the SRS configuration indicating at least a SRS comb offset hopping configuration for the hopping pattern. The communications manager 1120 may be configured as or otherwise support a means for receiving the SRSs across multiple SRS transmission occasions according to the SRS configuration and the hopping pattern.

By including or configuring the communications manager 1120 in accordance with examples as described herein, the device 1105 may support techniques for configuring SRS comb offset hopping across multiple SRS Tx occasions to improve interference management techniques based on pseudo-random sequence initialization.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of comb offset hopping for SRS transmissions as described herein, or the processor 1135 and the memory 1125 may be otherwise configured to perform or support such operations.

Figure 12:
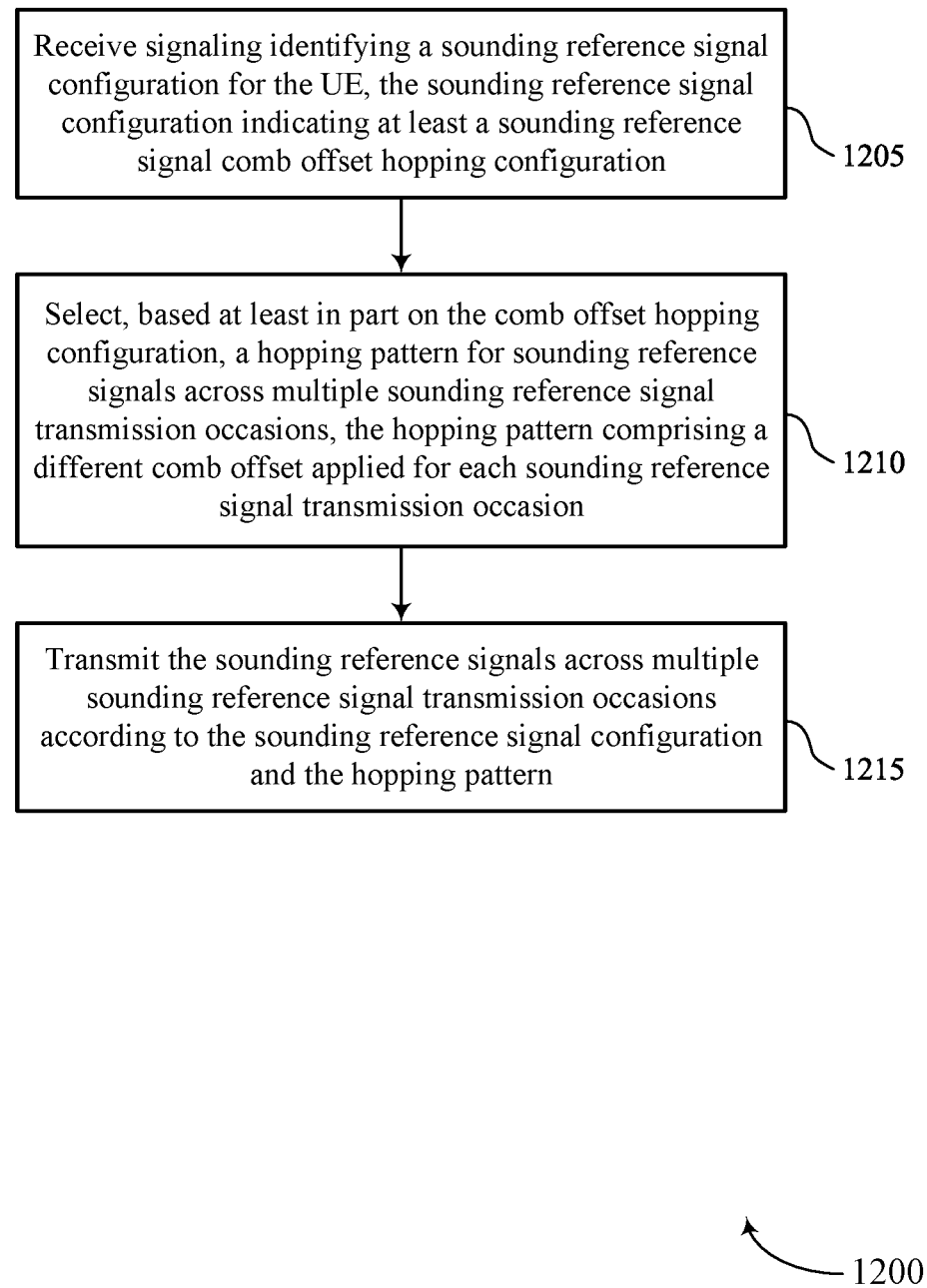
FIGS. 12 and 13 show flowcharts illustrating methods that support comb offset hopping for SRS transmissions in accordance with one or more aspects of the present disclosure.

FIG. 12 shows a flowchart illustrating a method 1200 that supports comb offset hopping for SRS transmissions in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving signaling identifying a SRS configuration for the UE, the SRS configuration indicating at least a SRS comb offset hopping configuration. The operations of 1205 may be performed in accordance with examples as disclosed herein. In some examples, aspects of the operations of 1205 may be performed by an SRS configuration manager 625 as described with reference to FIG. 6.

At 1210, the method may include selecting, based on the comb offset hopping configuration, a hopping pattern for SRS transmissions across multiple SRS transmission occasions, the hopping pattern including a different comb offset applied for each SRS transmission occasion. The operations of 1210 may be performed in accordance with examples as disclosed herein. In some examples, aspects of the operations of 1210 may be performed by a hopping pattern manager 630 as described with reference to FIG. 6.

At 1215, the method may include transmitting the SRSs across multiple SRS transmission occasions according to the SRS configuration and the hopping pattern. The operations of 1215 may be performed in accordance with examples as disclosed herein. In some examples, aspects of the operations of 1215 may be performed by an SRS manager 635 as described with reference to FIG. 6.

Figure 13:
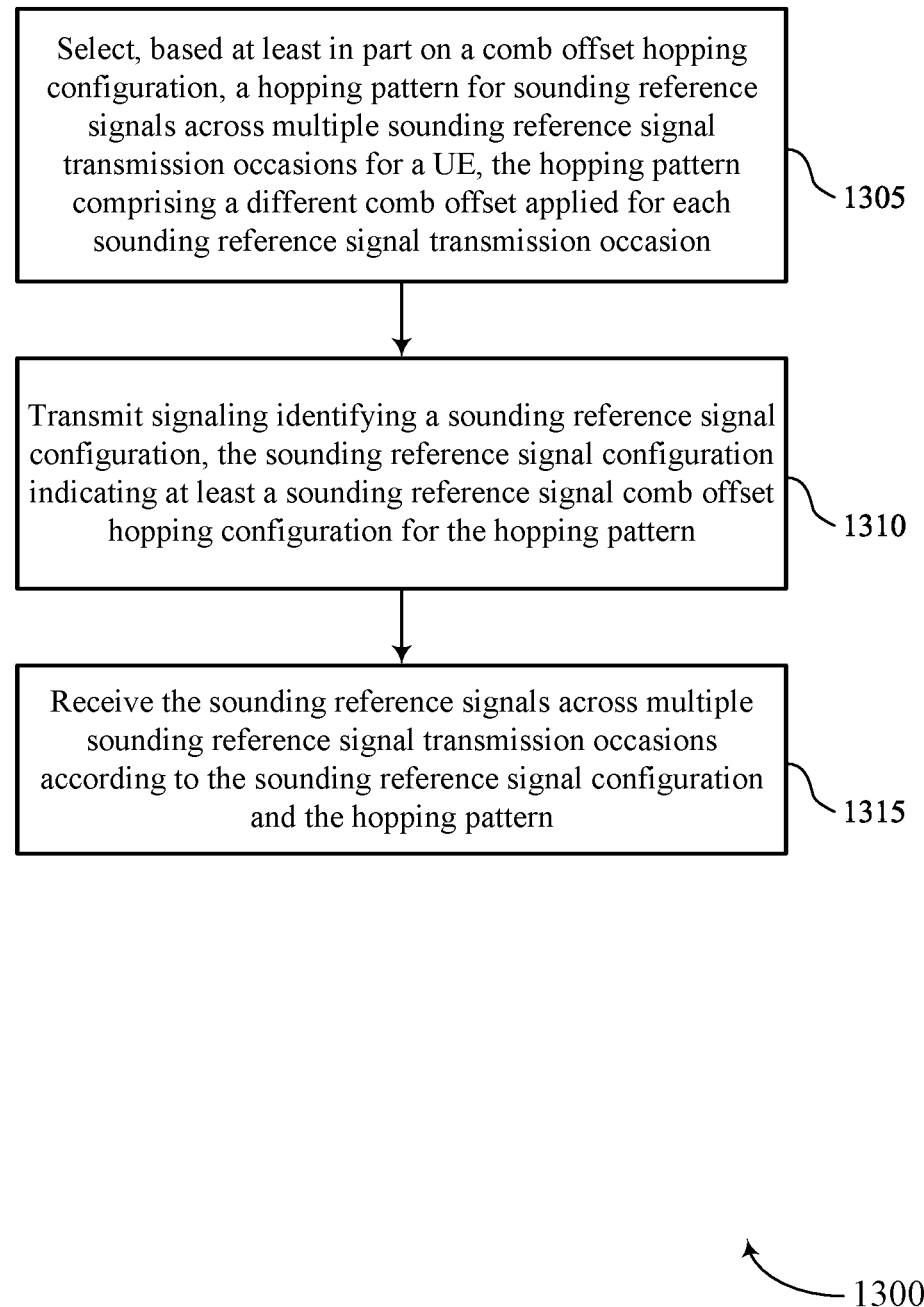

FIG. 13 shows a flowchart illustrating a method 1300 that supports comb offset hopping for SRS transmissions in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include selecting, based on a comb offset hopping configuration, a hopping pattern for SRS transmissions across multiple SRS transmission occasions for a UE, the hopping pattern including a different comb offset applied for each SRS transmission occasion. The operations of 1305 may be performed in accordance with examples as disclosed herein. In some examples, aspects of the operations of 1305 may be performed by a hopping pattern manager 1025 as described with reference to FIG. 10.

At 1310, the method may include transmitting signaling identifying a SRS configuration, the SRS configuration indicating at least a SRS comb offset hopping configuration for the hopping pattern. The operations of 1310 may be performed in accordance with examples as disclosed herein. In some examples, aspects of the operations of 1310 may be performed by an SRS configuration manager 1030 as described with reference to FIG. 10.

At 1315, the method may include receiving the SRSs across multiple SRS transmission occasions according to the SRS configuration and the hopping pattern. The operations of 1315 may be performed in accordance with examples as disclosed herein. In some examples, aspects of the operations of 1315 may be performed by an SRS manager 1035 as described with reference to FIG. 10.

The following provides an overview of aspects of the present disclosure:

Aspect 1: A method for wireless communication at a UE, comprising: receiving signaling identifying a sounding reference signal configuration for the UE, the sounding reference signal configuration indicating at least a sounding reference signal comb offset hopping configuration; selecting, based at least in part on the comb offset hopping configuration, a hopping pattern for sounding reference signal transmissions across multiple sounding reference signal transmission occasions, the hopping pattern comprising a different comb offset applied for each sounding reference signal transmission occasion; and transmitting the sounding reference signals across multiple sounding reference signal transmission occasions according to the sounding reference signal configuration and the hopping pattern.

Aspect 2: The method of aspect 1, further comprising: identifying, based at least in part on the offset hopping configuration, a slot number within a radio frame and a symbol number within a slot, wherein the multiple sounding reference signal transmission occasions are based at least in part on the radio frame and the slot, wherein the hopping pattern is selected based at least in part on the slot number within the radio frame and the symbol number within the slot.

Aspect 3: The method of aspect 2, wherein the hopping pattern defines different comb offsets for different symbols within the slot.

Aspect 4: The method of any of aspects 1 through 3, further comprising: identifying, based at least in part on the offset hopping configuration, a slot number within a radio frame, wherein the multiple sounding reference signal transmission occasions are based at least in part on the radio frame, wherein the hopping pattern is selected based at least in part on the slot number within the radio frame.

Aspect 5: The method of aspect 4, wherein the hopping pattern defines a same comb offset for different symbols within a slot of the radio frame.

Aspect 6: The method of any of aspects 1 through 5, further comprising: identifying, based at least in part on the offset hopping configuration, a slot number within a radio frame and a starting symbol, wherein the multiple sounding reference signal transmission occasions are based at least in part on the radio frame and the starting symbol, wherein the hopping pattern is selected based at least in part on the slot number within the radio frame and the starting symbol.

Aspect 7: The method of aspect 6, wherein the hopping pattern defines a same comb offset for different symbols within a slot of the radio frame.

Aspect 8: The method of any of aspects 1 through 7, further comprising: identifying, based at least in part on the comb offset hopping configuration, a sequence initialization indicator associated with an identifier of the sounding reference signal configuration, wherein the hopping pattern is selected based at least in part on the sequence initialization indicator.

Aspect 9: The method of aspect 8, further comprising: identifying, based at least in part on the comb offset hopping configuration, a cyclic shift information associated with the sounding reference signal configuration, wherein the hopping pattern is selected based at least in part on the sequence initialization indicator and the cyclic shift information.

Aspect 10: The method of any of aspects 1 through 9, wherein the signaling comprises RRC signaling.

Aspect 11: A method for wireless communication at a network entity, comprising: selecting, based at least in part on a comb offset hopping configuration, a hopping pattern for sounding reference signal transmissions across multiple sounding reference signal transmission occasions for a UE, the hopping pattern comprising a different comb offset applied for each sounding reference signal transmission occasion; transmitting signaling identifying a sounding reference signal configuration, the sounding reference signal configuration indicating at least a sounding reference signal comb offset hopping configuration for the hopping pattern; and receiving the sounding reference signals across multiple sounding reference signal transmission occasions according to the sounding reference signal configuration and the hopping pattern.

Aspect 12: The method of aspect 11, further comprising: identifying, based at least in part on the offset hopping configuration, a slot number within a radio frame and a symbol number within a slot, wherein the multiple sounding reference signal transmission occasions are based at least in part on the radio frame and the slot, wherein the hopping pattern is selected based at least in part on the slot number within the radio frame and the symbol number within the slot.

Aspect 13: The method of aspect 12, wherein the hopping pattern defines different comb offsets for different symbols within the slot.

Aspect 14: The method of any of aspects 11 through 13, further comprising: identifying, based at least in part on the offset hopping configuration, a slot number within a radio frame, wherein the multiple sounding reference signal transmission occasions are based at least in part on the radio frame, wherein the hopping pattern is selected based at least in part on the slot number within the radio frame.

Aspect 15: The method of aspect 14, wherein the hopping pattern defines a same comb offset for different symbols within a slot of the radio frame.

Aspect 16: The method of any of aspects 11 through 15, further comprising: identifying, based at least in part on the offset hopping configuration, a slot number within a radio frame and a starting symbol, wherein the multiple sounding reference signal transmission occasions are based at least in part on the radio frame and the starting symbol, wherein the hopping pattern is selected based at least in part on the slot number within the radio frame and the starting symbol.

Aspect 17: The method of aspect 16, wherein the hopping pattern defines a same comb offset for different symbols within the slot.

Aspect 18: The method of any of aspects 11 through 17, further comprising: identifying, based at least in part on the comb offset hopping configuration, a sequence initialization indicator associated with an identifier of the sounding reference signal configuration, wherein the hopping pattern is selected based at least in part on the sequence initialization indicator.

Aspect 19: The method of aspect 18, further comprising: identifying, based at least in part on the comb offset hopping configuration, a cyclic shift information associated with the sounding reference signal configuration, wherein the hopping pattern is selected based at least in part on the sequence initialization indicator and the cyclic shift information.

Aspect 20: The method of any of aspects 11 through 19, wherein the signaling comprises RRC signaling.

Aspect 21: An apparatus for wireless communication at a UE, comprising a processor; memory coupled with the processor; and instructions stored in the memory and executable by the processor to cause the apparatus to perform a method of any of aspects 1 through 10.

Aspect 22: An apparatus for wireless communication at a UE, comprising at least one means for performing a method of any of aspects 1 through 10.

Aspect 23: A non-transitory computer-readable medium storing code for wireless communication at a UE, the code comprising instructions executable by a processor to perform a method of any of aspects 1 through 10.

Aspect 24: An apparatus for wireless communication at a network entity, comprising a processor; memory coupled with the processor; and instructions stored in the memory and executable by the processor to cause the apparatus to perform a method of any of aspects 11 through 20.

Aspect 25: An apparatus for wireless communication at a network entity, comprising at least one means for performing a method of any of aspects 11 through 20.

Aspect 26: A non-transitory computer-readable medium storing code for wireless communication at a network entity, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving signaling identifying a sounding reference signal configuration for the UE, the sounding reference signal configuration indicating at least a sounding reference signal comb offset hopping configuration;
   selecting, based at least in part on the comb offset hopping configuration, a hopping pattern for sounding reference signals across multiple sounding reference signal transmission occasions comprising a first sounding reference signal transmission occasion in a first time domain resource and a second sounding reference signal transmission occasion in a second time domain resource different from the first time domain resource, the hopping pattern comprising a different comb offset applied for sounding reference signal transmissions by the UE during each sounding reference signal transmission occasion; and
   transmitting the sounding reference signals across multiple sounding reference signal transmission occasions according to the sounding reference signal configuration and the hopping pattern.

2. The method of claim 1, further comprising:
   identifying, based at least in part on the comb offset hopping configuration, a slot number within a radio frame and a symbol number within a slot, wherein the multiple sounding reference signal transmission occasions are based at least in part on the radio frame and the slot, wherein the hopping pattern is selected based at least in part on the slot number within the radio frame and the symbol number within the slot.

3. The method of claim 2, wherein the hopping pattern defines different comb offsets for different symbols within the slot.

4. The method of claim 1, further comprising:
   identifying, based at least in part on the comb offset hopping configuration, a slot number within a radio frame, wherein the multiple sounding reference signal transmission occasions are based at least in part on the radio frame, wherein the hopping pattern is selected based at least in part on the slot number within the radio frame.

5. The method of claim 4, wherein the hopping pattern defines a same comb offset for different symbols within a slot of the radio frame.

6. The method of claim 1, further comprising:
   identifying, based at least in part on the comb offset hopping configuration, a slot number within a radio frame and a starting symbol, wherein the multiple sounding reference signal transmission occasions are based at least in part on the radio frame and the starting symbol, wherein the hopping pattern is selected based at least in part on the slot number within the radio frame and the starting symbol.

7. The method of claim 6, wherein the hopping pattern defines a same comb offset for different symbols within a slot of the radio frame.

8. The method of claim 1, further comprising:
identifying, based at least in part on the comb offset hopping configuration, a sequence initialization indicator associated with an identifier of the sounding reference signal configuration, wherein the hopping pattern is selected based at least in part on the sequence initialization indicator.

9. The method of claim 8, further comprising:
identifying, based at least in part on the comb offset hopping configuration, a cyclic shift information associated with the sounding reference signal configuration, wherein the hopping pattern is selected based at least in part on the sequence initialization indicator and the cyclic shift information.

10. The method of claim 1, wherein the signaling comprises radio resource control (RRC) signaling.

11. A method for wireless communications at a network entity, comprising:
selecting, based at least in part on a comb offset hopping configuration, a hopping pattern for sounding reference signals across multiple sounding reference signal transmission occasions for a user equipment (UE), the multiple sounding reference signal transmission occasions comprising a first sounding reference signal transmission occasion in a first time domain resource and a second sounding reference signal transmission occasion in a second time domain resource different from the first time domain resource, the hopping pattern comprising a different comb offset applied for sounding reference signal transmissions by the UE during each sounding reference signal transmission occasion;
transmitting signaling identifying a sounding reference signal configuration, the sounding reference signal configuration indicating at least a sounding reference signal comb offset hopping configuration for the hopping pattern; and
receiving the sounding reference signals across multiple sounding reference signal transmission occasions according to the sounding reference signal configuration and the hopping pattern.

12. The method of claim 11, further comprising:
identifying, based at least in part on the comb offset hopping configuration, a slot number within a radio frame and a symbol number within a slot, wherein the multiple sounding reference signal transmission occasions are based at least in part on the radio frame and the slot, wherein the hopping pattern is selected based at least in part on the slot number within the radio frame and the symbol number within the slot.

13. The method of claim 12, wherein the hopping pattern defines different comb offsets for different symbols within the slot.

14. The method of claim 11, further comprising:
identifying, based at least in part on the comb offset hopping configuration, a slot number within a radio frame, wherein the multiple sounding reference signal transmission occasions are based at least in part on the radio frame, wherein the hopping pattern is selected based at least in part on the slot number within the radio frame.

15. The method of claim 14, wherein the hopping pattern defines a same comb offset for different symbols within a slot of the radio frame.

16. The method of claim 11, further comprising:
identifying, based at least in part on the comb offset hopping configuration, a slot number within a radio frame and a starting symbol, wherein the multiple sounding reference signal transmission occasions are based at least in part on the radio frame and the starting symbol, wherein the hopping pattern is selected based at least in part on the slot number within the radio frame and the starting symbol.

17. The method of claim 16, wherein the hopping pattern defines a same comb offset for different symbols within the slot.

18. The method of claim 11, further comprising:
identifying, based at least in part on the comb offset hopping configuration, a sequence initialization indicator associated with an identifier of the sounding reference signal configuration, wherein the hopping pattern is selected based at least in part on the sequence initialization indicator.

19. The method of claim 18, further comprising:
identifying, based at least in part on the comb offset hopping configuration, a cyclic shift information associated with the sounding reference signal configuration, wherein the hopping pattern is selected based at least in part on the sequence initialization indicator and the cyclic shift information.

20. An apparatus for wireless communications at a user equipment (UE), comprising:
a processor;
memory in electronic communication with the processor; and
instructions stored in the memory, wherein the instructions are executable by the processor to:
receive signaling identifying a sounding reference signal configuration for the UE, the sounding reference signal configuration indicating at least a sounding reference signal comb offset hopping configuration;
select, based at least in part on the comb offset hopping configuration, a hopping pattern for sounding reference signal across multiple sounding reference signal transmission occasions comprising a first sounding reference signal transmission occasion in a first time domain resource and a second sounding reference signal transmission occasion in a second time domain resource different from the first time domain resource, the hopping pattern comprising a different comb offset applied for sounding reference signal transmissions by the UE during each sounding reference signal transmission occasion; and
transmit the sounding reference signals across multiple sounding reference signal transmission occasions according to the sounding reference signal configuration and the hopping pattern.

21. The apparatus of claim 20, wherein the instructions are further executable by the processor to cause the apparatus to:
identify, based at least in part on the comb offset hopping configuration, a slot number within a radio frame and a symbol number within a slot, wherein the multiple sounding reference signal transmission occasions are based at least in part on the radio frame and the slot, wherein the hopping pattern is selected based at least in part on the slot number within the radio frame and the symbol number within the slot.

22. The apparatus of claim 21, wherein the hopping pattern defines different comb offsets for different symbols within the slot.

23. The apparatus of claim 20, wherein the instructions are further executable by the processor to cause the apparatus to:
    identify, based at least in part on the comb offset hopping configuration, a slot number within a radio frame, wherein the multiple sounding reference signal transmission occasions are based at least in part on the radio frame, wherein the hopping pattern is selected based at least in part on the slot number within the radio frame.

24. The apparatus of claim 23, wherein the hopping pattern defines a same comb offset for different symbols within a slot of the radio frame.

25. The apparatus of claim 20, wherein the instructions are further executable by the processor to cause the apparatus to:
    identify, based at least in part on the comb offset hopping configuration, a slot number within a radio frame and a starting symbol, wherein the multiple sounding reference signal transmission occasions are based at least in part on the radio frame and the starting symbol, wherein the hopping pattern is selected based at least in part on the slot number within the radio frame and the starting symbol.

26. The apparatus of claim 25, wherein the hopping pattern defines a same comb offset for different symbols within a slot of the radio frame.

27. The apparatus of claim 20, wherein the instructions are further executable by the processor to cause the apparatus to:
    identify, based at least in part on the comb offset hopping configuration, a sequence initialization indicator associated with an identifier of the sounding reference signal configuration, wherein the hopping pattern is selected based at least in part on the sequence initialization indicator.

28. The apparatus of claim 27, wherein the instructions are further executable by the processor to cause the apparatus to:
    identify, based at least in part on the comb offset hopping configuration, a cyclic shift information associated with the sounding reference signal configuration, wherein the hopping pattern is selected based at least in part on the sequence initialization indicator and the cyclic shift information.

29. The apparatus of claim 20, wherein:
the signaling comprises radio resource control (RRC) signaling.

30. An apparatus for wireless communications at a network entity, comprising:
a processor;
memory in electronic communication with the processor; and
instructions stored in the memory, wherein the instructions are executable by the processor to:
    select, based at least in part on a comb offset hopping configuration, a hopping pattern for sounding reference signals across multiple sounding reference signal transmission occasions for a user equipment (UE), the multiple sounding reference signal transmission occasions comprising a first sounding reference signal transmission occasion in a first time domain resource and a second sounding reference signal transmission occasion in a second time domain resource different from the first time domain resource, the hopping pattern comprising a different comb offset applied for sounding reference signal transmissions by the UE during each sounding reference signal transmission occasion;
    transmit signaling identifying a sounding reference signal configuration, the sounding reference signal configuration indicating at least a sounding reference signal comb offset hopping configuration for the hopping pattern; and
    receive the sounding reference signals across multiple sounding reference signal transmission occasions according to the sounding reference signal configuration and the hopping pattern.

* * * * *